United States Patent
Fertig et al.

(10) Patent No.: US 11,119,116 B2
(45) Date of Patent: Sep. 14, 2021

(54) ACCELEROMETER FOR DETERMINING AN ACCELERATION BASED ON MODULATED OPTICAL SIGNALS

(71) Applicant: Honeywell International Inc., Morris Plains, NJ (US)

(72) Inventors: Chad Fertig, Bloomington, MN (US); Arthur Savchenko, Kirkland, WA (US); Joshua Dorr, Minneapolis, MN (US); Neil Krueger, Saint Paul, MN (US); Steven Tin, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 142 days.

(21) Appl. No.: 16/371,762

(22) Filed: Apr. 1, 2019

(65) Prior Publication Data
US 2020/0309812 A1 Oct. 1, 2020

(51) Int. Cl.
*G01P 15/097* (2006.01)
*G01P 15/08* (2006.01)

(52) U.S. Cl.
CPC ........ *G01P 15/097* (2013.01); *G01P 15/0802* (2013.01)

(58) Field of Classification Search
CPC ...... G01P 3/36; G01P 15/097; G01P 15/0802; G01P 15/093; G01H 9/00; G01H 9/004; G01H 13/00
See application file for complete search history.

(56) References Cited

U.S. PATENT DOCUMENTS

| 3,499,331 A | 3/1970 | Miller |
| 4,233,847 A | 11/1980 | Walker |

(Continued)

FOREIGN PATENT DOCUMENTS

| CN | 107219378 A | 9/2017 |
| CN | 108519498 A | 9/2018 |

(Continued)

OTHER PUBLICATIONS

Extended Search Report from counterpart European Application No. 20154436.8, dated Sep. 1, 2020, 8 pp.

(Continued)

*Primary Examiner* — Benjamin R Schmitt
(74) *Attorney, Agent, or Firm* — Shumaker & Sieffert, P.A.

(57) ABSTRACT

This disclosure is related to devices, systems, and techniques for determining, using an electro-opto-mechanical accelerometer system, a frequency value in order to determine an acceleration value. For example, an accelerometer system includes a light-emitting device configured to emit an optical signal and a circuit. The circuit is configured to modulate, using a modulating device, the optical signal to produce a modulated optical signal, receive, using a photoreceiver, the modulated optical signal, convert, using the photoreceiver, the modulated optical signal into an electrical signal, process the electrical signal to obtain a processed electrical signal, and transmit the processed electrical signal to the modulating device, where the modulating device is configured to modulate the optical signal based on the processed electrical signal. Additionally, the circuit is configured to determine, based on the processed electrical signal, a frequency value.

20 Claims, 8 Drawing Sheets

(56) References Cited

U.S. PATENT DOCUMENTS

| | | | |
|---|---|---|---|
| 4,345,482 A | 8/1982 | Adolfsson et al. |
| 4,422,331 A | 12/1983 | Walker |
| 4,428,234 A | 1/1984 | Walker |
| 4,628,175 A | 12/1986 | Nissl |
| 4,733,561 A | 3/1988 | Gilby |
| 4,739,660 A | 4/1988 | Fima |
| 4,897,541 A | 1/1990 | Philips |
| 4,900,918 A | 2/1990 | Killian |
| 5,013,909 A | 5/1991 | Sondergeld et al. |
| 5,095,763 A | 3/1992 | Delatorre |
| 5,109,693 A | 5/1992 | Hojo et al. |
| 5,291,014 A | 3/1994 | Brede et al. |
| 5,496,436 A | 3/1996 | Bernstein et al. |
| 5,501,103 A | 3/1996 | Woodruff et al. |
| 5,559,358 A | 9/1996 | Burns et al. |
| 5,689,107 A | 11/1997 | Hsu |
| 5,770,473 A | 6/1998 | Hall et al. |
| 5,786,927 A | 7/1998 | Greywall |
| 6,018,390 A | 1/2000 | Youmans et al. |
| 6,182,509 B1 | 2/2001 | Leung |
| 6,350,983 B1 | 2/2002 | Kaldor et al. |
| 6,481,283 B1 | 11/2002 | Cardarelli |
| 6,494,095 B1 | 12/2002 | Wan |
| 6,510,737 B1 | 1/2003 | Hobbs et al. |
| 6,546,798 B1 | 4/2003 | Waters et al. |
| 6,594,061 B2 | 7/2003 | Huang et al. |
| 6,745,627 B1 | 6/2004 | Woodruff et al. |
| 6,763,723 B1 | 7/2004 | Zook et al. |
| 6,789,053 B2 | 9/2004 | Collins |
| 6,807,325 B1 | 10/2004 | Kraemmer et al. |
| 6,911,765 B2 | 6/2005 | Kawashima |
| 6,947,642 B2 | 9/2005 | Yamazaki |
| 6,955,085 B2 | 10/2005 | Jones et al. |
| 7,243,542 B2 | 7/2007 | Hulsing, II |
| 7,427,522 B2 | 9/2008 | Morikawa et al. |
| 7,573,924 B2 | 8/2009 | Tsuda et al. |
| 7,612,887 B2 | 11/2009 | Choi et al. |
| 7,613,367 B2 | 11/2009 | Levy et al. |
| 7,743,661 B2 | 6/2010 | Berthold et al. |
| 7,808,618 B1 | 10/2010 | Tawney et al. |
| 7,822,090 B2 | 10/2010 | Minamio et al. |
| 7,881,565 B2 | 2/2011 | Kilic et al. |
| 7,920,270 B2 | 4/2011 | Chow et al. |
| 7,980,115 B2 | 7/2011 | Stewart et al. |
| 8,159,736 B2 | 4/2012 | Maleki et al. |
| 8,288,926 B2 | 10/2012 | Furuhata et al. |
| 8,334,984 B2 | 12/2012 | Perez et al. |
| 8,537,368 B2 | 9/2013 | Kilic et al. |
| 8,677,821 B2 | 3/2014 | Ayazi et al. |
| 8,726,732 B2 | 5/2014 | Littler et al. |
| 8,875,578 B2 | 11/2014 | Smith |
| 8,887,567 B2 | 11/2014 | Dwyer et al. |
| 8,904,867 B2 | 12/2014 | Martin et al. |
| 8,960,002 B2 | 2/2015 | Nasiri et al. |
| 9,069,004 B2 | 6/2015 | Bhave et al. |
| 9,194,782 B2 | 11/2015 | Jeon et al. |
| 9,207,081 B2 | 12/2015 | Geen |
| 9,228,916 B2 | 1/2016 | Valdevit et al. |
| 9,239,340 B2 | 1/2016 | Hutchinson et al. |
| 9,261,525 B2 | 2/2016 | Thiruvenkatanathan et al. |
| 9,335,271 B2 | 5/2016 | Pruessner et al. |
| 9,417,260 B2 | 8/2016 | Bulatowicz |
| 9,455,354 B2 | 9/2016 | Acar |
| 9,618,531 B2 | 4/2017 | Painter et al. |
| 9,753,055 B2 | 9/2017 | Paquet et al. |
| 9,766,099 B2 | 9/2017 | Pechstedt |
| 9,874,581 B2 | 1/2018 | Tin et al. |
| 9,927,458 B2 | 3/2018 | Bramhavar et al. |
| 9,983,225 B2 | 5/2018 | Fertig et al. |
| 10,031,158 B1 | 7/2018 | Douglas et al. |
| 10,079,467 B2 | 9/2018 | Guzman et al. |
| 10,107,936 B2 | 11/2018 | Compton |
| 10,126,321 B2 | 11/2018 | Zandi et al. |
| 10,139,564 B1 | 11/2018 | Homeijer et al. |
| 2001/0047688 A1 | 12/2001 | Woodruff et al. |
| 2004/0129867 A1 | 7/2004 | Mackey |
| 2013/0204573 A1 | 8/2013 | Kandler |
| 2013/0298675 A1 | 11/2013 | Thiruvenkatanathan et al. |
| 2014/0043614 A1 | 2/2014 | Dhayalan et al. |
| 2015/0020590 A1 | 1/2015 | Painter et al. |
| 2016/0139170 A1 | 5/2016 | Dwyer et al. |
| 2016/0223329 A1 | 8/2016 | Zandi et al. |
| 2016/0349283 A1 | 12/2016 | Bramhavar et al. |
| 2016/0377647 A1* | 12/2016 | Fertig ............ G01P 15/097 |
| | | 73/1.38 |
| 2017/0057809 A1 | 3/2017 | Saint-patrice et al. |
| 2017/0089944 A1 | 3/2017 | Duraffourg |
| 2017/0242050 A1 | 8/2017 | Pan et al. |
| 2018/0003749 A1 | 1/2018 | Dogiamis et al. |
| 2018/0128850 A1 | 5/2018 | Bramhavar et al. |
| 2018/0172723 A1 | 6/2018 | Bramhavar et al. |
| 2018/0246139 A1 | 8/2018 | Zotov et al. |
| 2018/0267078 A1 | 9/2018 | Sato |
| 2019/0049485 A1 | 2/2019 | Stewart et al. |

FOREIGN PATENT DOCUMENTS

| | | |
|---|---|---|
| EP | 1310801 A1 | 5/2003 |
| EP | 3112879 A1 | 4/2017 |
| JP | H10327115 A | 12/1998 |
| WO | 0071981 A1 | 11/2000 |
| WO | 2008043737 A2 | 4/2008 |
| WO | 2015/080662 A1 | 6/2015 |
| WO | 2018197857 A1 | 11/2018 |

OTHER PUBLICATIONS

Kavitha et al., "Study of squeeze film damping characteristics under different gas mediums in a capacitive MEMS accelerometer," The Brazilian Society of Mechanical Sciences and Engineering, Feb. 20, 2015, 12 pp.

Beyazoglu, "Integrated MEMS Cavity Optomechanical Oscillators for Wireless and Optical Communications," Electrical Engineering and Computer Sciences University of California at Berkeley, Aug. 12, 2016, 130 pp.

Chen et al., "Optical Microfiber Technology for Current, Temperature, Acceleration, Acoustic, Humidity and Ultraviolet Light Sensing," Laser Physics and Photonic Devices Laboratories, School of Engineering, University of Australia, sensors, MDPI, Dec. 28, 2017, 25 pp.

Chiu et al., "Development and Characterization of a CMOS-MEMS Accelerometer With Differential LC-Tank Oscillators," Journal of Microelectromechanical Systems, vol. 22, No. 6, Dec. 2013, pp. 1285-1295.

Cohen et al., "High-Q microphotonic electro-optic modulator," Department of Electrical Engineering, University of Southern California, Pergamon, Solid-State Electronics, vol. 45, Mar. 29, 2001, 13 pp.

Gerberding et al., "Optomechanical reference accelerometer," Metrologia, vol. 52, No. 5, Apr. 2015, 13 pp.

Sutter, "Optical Whispering-Gallery Mode Resonators for Applications in Optical Communication and Frequency Control," Electrical Engineering and Computer Sciences University of California at Berkeley, Dec. 20, 2013, 127 pp.

Hutchison et al., "Z-Axis Optomechical Accelerometer," IEEE 25th International Conference on Micro Electro Mechanical Systems (MEMS), Jan. 29 through Feb. 2, 2012, 5 pp.

Krause et al., "A high-resolution microchip optomechanical accelerometer," Nature Photonics, Oct. 14, 2012, 5 pp.

Krause et al., "Optical read out and feedback cooling of a nanostring optomechanical cavity," Laboratory of Applied Physics, California Institute of Technology, Jun. 3, 2015, 13 pp.

Lee et al., "Fabrication of a Micro-Opto-Mechanical Accelerometer Based on Intensity Modulation", Microsystems Technologies, vol. 10, Issue 2, Jan. 2004, 12 pp.

Li et al., "Characterization and Testing of a Micro-g Whispering Gallery Mode Optomechanical Accelerometer," Journal of Lightwave Technology, vol. 36, Issue 18, May 25, 2018, 8 pp.

(56) References Cited

OTHER PUBLICATIONS

Lu et al. "Optical Acceleration Measurement Method with Large Non-ambiguity Range and High Resolution via Synthetic Wavelength and Single Wavelength Superheterodyne Interferometry," MDPI, Sensors, vol. 18, Oct. 12, 2018, 11 pp.
Miao et al., "A microelectromechanically controlled cavity optomechanical sensing system," New Journal of Physics, Apr. 4, 2012, 17 pp.
Oudich et al., "Optomechanic interaction in a corrugated phoxonic nanobeam cavity," Physical Review B, Jun. 2014, 9 pp.
Pruessner et al., "Integrated waveguide-BDR microcavity optomechanical system," Optical Society of America, Optics Express, vol. 19, No. 22, Oct. 24, 2011, 15 pp.
Schliesser et al., "High-sensitivity monitoring of micromechanical vibration using optical whispering gallery mode resonators," New Journal of Physics, vol. 10, Sep. 30, 2008, 26 pp.
Sheikhaleh et al., "An Optical MEMS Accelerometer Based on a Two-Dimensional Photonic Crystal Add-Drop Filter," IEEE, Journal of Lightwave Technology, vol. 35, No. 14, Jul. 15, 2017, 6 pp.
U.S. Appl. No. 16/371,657, filed Apr. 1, 2019, by Fertig et al.
U.S. Appl. No. 16/391,074, filed Apr. 22, 2019, by Dorr et al.
U.S. Appl. No. 16/391,114, filed Apr. 1, 2019, by Dorr et al.
U.S. Appl. No. 16/514,864, filed Jul. 17, 2019, by Krueger et al.
U.S. Appl. No. 16/514,905, filed Jul. 17, 2019, by Krueger et al.
U.S. Appl. No. 16/539,949, filed Aug. 13, 2019, by Krueger et al.
U.S. Appl. No. 16/539,974, filed Aug. 13, 2019, by Dorr et al.
U.S. Appl. No. 16/539,984, filed Aug. 13, 2019, by Krueger et al.
Williamson et al., "Dual-Carrier Floquet Circulator with Time-Modulated Optical Resonators," Microelectronics Research Center, American Chemical Society, ACS Photonics, vol. 5, Aug. 20, 2018, 9 pp.
Yen et al., "Corrugated aluminum nitride energy harvesters for high energy conversion effectiveness," Journal of Micromechanics and Microengineering, vol. 21, No. 8, Jul. 2011, 3 pp.
Zhang et al., "A Compact Low-Power Oscillation Circuit for the High Performance Silicon Oscillating Accelerometer," AIP Conference Proceedings 1890, 040068, Oct. 5, 2017, 7 pp.
Zhang et al., "Noise suppression of a micro-grating accelerometer based on the dual modulation method," OSA Publishing, Applied Optics, vol. 56, Issue 36, Apr. 2, 2019, 4 pp.
Response to Extended Search Report dated Sep. 1, 2020, from counterpart European Application No. 20154436.8, filed Oct. 29, 2020, 23 pp.
Eichenfield et al., "A picogram and nanometer scale photonic crystal opto-mechanical cavity," Cornell University, arXiv:0812.2953v1, Dec. 16, 2008, 15 pp.
Grutter et al., "Si3N4 Nanobeam Optomechanical Crystals," IEEE Journal of Selected Topics in Quantum Electronics, vol. 21, No. 4, Jul.-Aug. 2015, 11 pp.
Grutter, "Optical Whispering-Gallery Mode Resonators for Applications in Optical Communication and Frequency Control," Electrical Engineering and Computer Sciences University of California at Berkeley, Dec. 20, 2013, 127 pp.

\* cited by examiner

ACCELEROMETER FOR DETERMINING AN ACCELERATION BASED ON MODULATED OPTICAL SIGNALS

STATEMENT REGARDING FEDERALLY SPONSORED RESEARCH OR DEVELOPMENT

This invention was made with Government support under N66001-16-C-4018 awarded by SPAWAR Systems Center Pacific. The Government has certain rights in the invention. This material is based upon work supported by the Defense Advanced Research Projects Agency (DARPA) and Space and Naval Warfare Systems Center Pacific (SSC Pacific)."

TECHNICAL FIELD

This disclosure relates to accelerometers.

BACKGROUND

Inertial guidance systems use navigation grade accelerometers, such as Resonating Beam Accelerometers (RBAs). An RBA senses acceleration via stress-induced frequency shifts of vibrational modes of proof mass anchor beams. The beams may take the form of Double Ended Tuning Fork (DETF) structures.

SUMMARY

In general, the disclosure is directed to devices, systems, and techniques for determining an acceleration of an object. More specifically, the disclosure describes techniques for determining the acceleration of the object using an accelerometer system including a proof mass, where the proof mass is suspended within a structure (e.g., a frame) by one or more double-ended tuning fork (DETF) structures configured to carry optical signals. The accelerometer system may be configured to measure frequencies associated with the DETF structures, and based on the frequencies, determine the acceleration. For example, as the object accelerates, the proof mass becomes displaced relative to the frame, causing the frequencies associated with the DETF structures to shift. Based on the frequency shifts, the accelerometer system determines the acceleration of the object. In some examples, the accelerometer system may track the acceleration of the object over a period of time, enabling processing circuitry to analyze the acceleration over time in order to determine a position of the object over a period of time.

In some examples, an accelerometer system includes a light-emitting device configured to emit an optical signal and a circuit. The circuit is configured to modulate, using a modulating device, the optical signal to produce a modulated optical signal, receive, using a photoreceiver, the modulated optical signal, convert, using the photoreceiver, the modulated optical signal into an electrical signal, process the electrical signal to obtain a processed electrical signal, transmit the processed electrical signal to the modulating device, where the modulating device is configured to modulate the optical signal based on the processed electrical signal, and determine, based on the processed electrical signal, a frequency value.

In some examples, a method includes emitting, using a light-emitting device, an optical signal, modulating, using modulating device of a circuit, the optical signal to produce a modulated optical signal, receiving, using a photoreceiver of a circuit, the modulated optical signal, converting, using the photoreceiver, the modulated optical signal into an electrical signal, processing the electrical signal to obtain a processed electrical signal, transmitting the processed electrical signal to the modulating device, where the modulating device is configured to modulate the optical signal based on the processed electrical signal, and determining, based on the processed electrical signal, a frequency value.

In some examples, a circuit is configured to receive, using a modulating device, an optical signal from a light-emitting device, modulate, using the modulating device, the optical signal to produce a modulated optical signal, receive, using a photoreceiver, the modulated optical signal, convert, using the photoreceiver, the modulated optical signal into an electrical signal, process the electrical signal to obtain a processed electrical signal, transmit the processed electrical signal to the modulating device, where the modulating device is configured to modulate the optical signal based on the processed electrical signal, and determine, based on the processed electrical signal, a frequency value.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
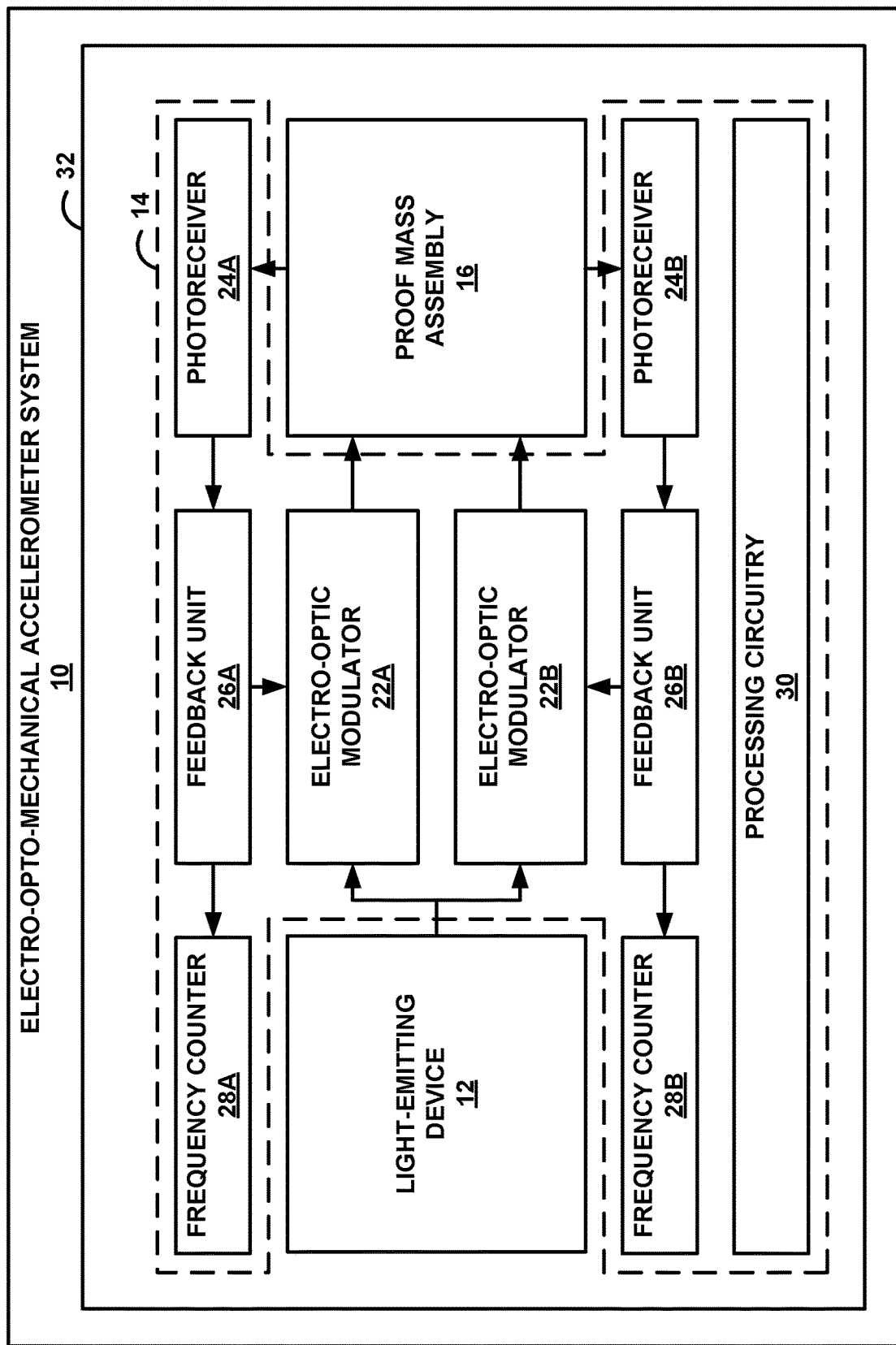
FIG. 1 is a block diagram illustrating an electro-opto-mechanical accelerometer system, in accordance with one or more techniques of this disclosure.

This disclosure describes devices, systems, and techniques for determining an acceleration of an object using an accelerometer system. For example, the accelerometer system may be an electro-opto-mechanical accelerometer system configured to precisely measure very high acceleration values (e.g., up to 500,000 meters per second squared (m/s$^2$)). The electro-opto-mechanical accelerometer system uses a combination of electrical signals, optical signals, and mechanical signals to determine the acceleration of the object.

In some cases, the accelerometer system is configured to measure the acceleration of the object in real-time or near real-time, such that processing circuitry may analyze the acceleration of the object over a period of time to determine a positional displacement of the object during the period of time. For example, the accelerometer system may be a part of an inertial navigation system (INS) for tracking a position of an object based, at least in part, on an acceleration of the object. Additionally, the accelerometer system may be located on or within the object such that the accelerometer system accelerates with the object. As such, when the object accelerates, the acceleration system (including the proof mass) accelerates with the object. Since acceleration over time is a derivative of velocity over time, and velocity over time is a derivative of position over time, processing circuitry may, in some cases, be configured to determine the position displacement of the object by performing a double integral of the acceleration of the object over the period of time. Determining a position of an object using the accelerometer system located on the object—and not using on a navigation system separate from the object (e.g., a Global Positioning System (GPS))—may be referred to as "dead reckoning."

In order to more accurately track the position of the object using the INS, it may be beneficial to improve a quality of acceleration values determined by the accelerometer system. For example, it may be beneficial to achieve high levels of sensitivity in the accelerometer system in order to improve the accuracy of the acceleration values. High sensitivity may enable the accelerometer system to detect very small acceleration values, detect a very small change in acceleration values, detect a large range of acceleration values, or any combination thereof. Additionally, it may be beneficial to accurately determine the acceleration of the object while the object is experiencing high levels of acceleration. In this way, the accelerometer system may enable an INS to accurately track the position of the object while a magnitude of the acceleration of the object is very high.

The accelerometer system may, in some examples, include a micro-electro-mechanical system (MEMS) accelerometer which includes a light-emitting device, a circuit, and a proof mass assembly which includes a proof mass suspended within a frame by double-ended tuning fork (DETF) structures. The DETF structures may be configured to carry optical signals. Additionally, optical signals may induce mechanical vibration in the DETF structures. In some cases, acceleration causes a displacement of the proof mass relative to the frame, the displacement affecting mechanical vibration frequencies (e.g., mechanical resonance frequencies) corresponding to the DETF structures. In this way, a mathematical relationship may exist between acceleration and the mechanical vibration frequencies of the DETF structures. As such, the mathematical relationship may be leveraged to determine acceleration. The accelerometer system uses, in some examples, a combination of optical signals and electrical signals to measure the mechanical vibration frequencies corresponding to the DETF structures and calculate acceleration based on the mechanical vibration frequencies.

For example, the circuit is configured to modulate, using an electro-optic modulator (EOM), an optical signal emitted by the light-emitting device. The modulated optical signal propagates through a DETF structure of the proof mass assembly, inducing mechanical vibration in the DETF structure. Additionally, the mechanical vibration further modulates the modulated optical signal such that the mechanical vibration frequency of the DETF structure is reflected in the modulated optical signal after the modulated optical signal passes through the DETF structure. The modulated optical signal arrives at a photoreceiver, which converts the modulated optical signal into an electrical signal. Additionally, the photoreceiver may preserve properties of the modulated optical signal when creating the electrical signal (e.g., preserve the mechanical vibrating frequency of the DETF structure). In this way, the circuit may process the electrical signal and analyze the processed electrical signal to determine the mechanical vibrating frequency of the DETF structure. Based on the mechanical vibrating frequency, processing circuitry may determine the acceleration of the object carrying the accelerometer system.

In some examples, the proof mass assembly further includes one or more tethers which contribute to the suspension of the proof mass. For example, the proof mass may be suspended in a first direction within the frame by the DETF structures. Additionally, the proof mass may be suspended in a second direction and a third direction by one or more tethers. In some cases, the one or more tethers prevent the proof mass from being displaced in the second direction and the third direction, but the DETF structures allow the proof mass to be displaced in the first direction. The first direction, the second direction, and the third direction may represent three axes (e.g., x-axis, y-axis, and z-axis) of a three-dimensional Cartesian space. In this way, the proof mass assembly, in some cases, may only allow the proof mass to displace along a single proof mass displacement axis, thus enabling the accelerometer system to measure the acceleration relative to the proof mass displacement axis. In some cases, to obtain an acceleration relative to all three Cartesian axes, three accelerometer systems are implemented such that the proof mass displacement axes of the respective accelerometer systems are aligned to form an x-axis, a y-axis, and a z-axis of a Cartesian space.

The accelerometer system may employ a positive feedback loop to simplify a manner in which the acceleration of the object is measured. For example, the circuit may direct the processed electric signal to the EOM, which modulates the optical signal emitted by the light-emitting device based on the processed electrical signal. In this way, the optical signal input to the proof mass assembly depends, at least in part, on the optical signal output from the proof mass assembly to the circuit. By using the positive feedback loop, the accelerometer system may improve an efficiency in which the circuit calculates the acceleration (e.g., decreases a number of steps required to calculate the acceleration). For example, to calculate the acceleration value, processing circuitry may subtract a baseline frequency value from the mechanical vibration frequency of the DETF structure to obtain a frequency difference value. The baseline frequency value may, in some cases, represent a mechanical vibration frequency of the DETF structure while the proof mass is not displaced along the proof mass displacement axis (i.e., acceleration is 0 m/s$^2$). In some examples, the frequency difference value is correlated with acceleration, enabling the processing circuitry to use the correlation to determine acceleration based on the frequency difference value. As such, the positive feedback loop may ensure that a small number of calculation steps is required to determine acceleration.

As discussed above, it may be desirable for the accelerometer system to achieve a high level of sensitivity in order to improve a quality of the acceleration values measured by the accelerometer system. In some cases, a set of parameters may impact the sensitivity of the accelerometer system. The set of parameters may, in some examples, include a pressure within a housing that encloses the light-emitting device, the circuit, and the proof mass assembly, a gas composition within the housing, and a power of the optical signal emitted by the light-emitting device. For example, in order to ensure that the DETF structures suspending the proof mass have a high mechanical quality factor (e.g., are not easily damped during oscillation)—thus improving a sensitivity of the accelerometer system, it may be beneficial for a pressure within the housing to be low (e.g., a vacuum or a near-vacuum). In other words, the sensitivity of the accelerometer system may increase as the pressure within the housing decreases. Additionally, increasing a power of the optical signal may cause a sensitivity of the accelerometer system to likewise increase.

In some examples, increasing a power of the optical signal while the pressure within the housing reflects high vacuum conditions may have negative effects. For example, in a high vacuum environment, the optical signal may cause components of the accelerometer system to heat up, and the optical signal may exhibit frequency nonlinearities caused by thermal effects—not by acceleration. Such nonlinearities may cause distortions in the accelerometer data which may be referred to as optical "shark fin" distortions, and the distortions may negatively affect the accuracy of the accelerometer data. The frequency nonlinearities may occur because heat induced by the optical signal might not be efficiently conducted away by an atmosphere inside the housing—when the atmosphere inside the housing is a vacuum or a near-vacuum. In some examples, the housing of the accelerometer system additionally encloses Helium gas having a partial pressure within a range between 0.1 torr and 760 torr. By enclosing the low-pressure Helium gas in the housing, the accelerometer system may enable heat from the optical signal to be sufficiently absorbed by the Helium gas—without negatively impacting the mechanical quality factor of the optical signal. In this way, the inclusion of Helium gas may resolve the conflict between the pressure within the housing and the power of the optical signal.

FIG. 1 is a block diagram illustrating an electro-opto-mechanical accelerometer system 10, in accordance with one or more techniques of this disclosure. As illustrated in FIG. 1, accelerometer system 10 includes light-emitting device 12, circuit 14, proof mass assembly 16, and housing 32. Additionally, in the example illustrated in FIG. 1, circuit 14 includes electro-optic-modulators (EOM) 22A, 22B (collectively, "EOMs 22"), photoreceivers 24A, 24B (collectively, "photoreceivers 24"), feedback units 26A, 26B (collectively, "feedback units 26"), frequency counters 28A, 28B (collectively, "frequency counters 28"), and processing circuitry 30. In the example of FIG. 1, light-emitting device 12, proof mass assembly 16, EOM 22A, photoreceiver 24A, feedback unit 26A, and frequency counter 28A form a first positive feedback loop. Additionally, in the example of FIG. 1, light-emitting device 12, proof mass assembly 16, EOM 22B, photoreceiver 24B, feedback unit 26B, and frequency counter 28B form a second positive feedback loop.

Accelerometer system 10 may, in some examples, be configured to determine an acceleration associated with an object (not illustrated in FIG. 1) based on a measured vibration frequency of a set of double-ended tuning fork (DETF) structures which suspend a proof mass of proof mass assembly 16, where the vibration of the DETF structures is induced by an optical signal emitted by light-emitting device 12. In some examples, the first positive feedback loop generates a first frequency value representing a vibration frequency of a first DETF structure and the second positive feedback loop generates a second frequency value representing a vibration frequency of a second DETF structure. Based on the first vibration frequency and the second vibration frequency, accelerometer system 10 may determine a first acceleration value and a second acceleration value, respectively. In some examples, accelerometer system 10 determines an acceleration of an object based on the first acceleration value and the second acceleration value. In some examples, accelerometer system 10 determines the acceleration of the object based on the first acceleration value. In some examples, accelerometer system 10 determines the acceleration of the object based on the second acceleration value.

Light-emitting device 12 may, in some cases, include a laser device configured to emit photons. In some examples, light-emitting device 12 emits the photons at an optical power within a range between 0.1 microwatts ($\mu W$) and 10 $\mu W$. In some examples, light-emitting device 12 is a semiconductor laser which includes a laser diode.

In some examples, circuit 14 may include a set of electrical components for processing and analyzing electrical signals received by photoreceivers 24. Components of circuit 14 are described in further detail below.

EOMs 22 may represent optical devices configured to modulate, based on electrical signals produced and processed by circuit 14, an optical signal emitted by light-emitting device 12. EOM 22A, for example, may include a set of crystals (e.g., Lithium Niobate crystals), where a refractive index of the set of crystals changes as a function of an electric field proximate to the set of crystals. The refractive index of the crystals may determine a manner in which EOM 22A modulates the optical signal. For example, the crystals of EOM 22A may receive the optical signal from light-emitting device 12 while EOM 22A is also receiving an electrical signal from feedback unit 26A of circuit 14. As such, the electrical signal may affect the electric field proximate to the crystals of EOM 22A, thus causing EOM 22A to modulate the optical signal. In some examples, EOM 22A modulates the optical signal by modulating the refractive index of the crystals using the electrical signal. EOM 22A, in some cases, may transmit the modulated optical signal to proof mass assembly 16. In some examples, EOM 22B is substantially similar to EOM 22A, with EOM 22B controlled by an electrical signal from feedback unit 26B.

In general, photoreceivers 24 may each include one or more transistors configured to absorb photons of an optical signal and output, in response to absorbing the photons, an electrical signal. In this manner, photoreceivers 24 may be configured to convert optical signals into electrical signals. Photoreceiver 24A, for example, may include a p-n junction that converts the photons of the optical signal into the electrical signal, where the electrical signal preserves at least some parameters of the optical signal. One or more frequency values and intensity values associated with the optical signal may be reflected in the electrical signal produced by photoreceiver 24A in response to photoreceiver 24A receiving the optical signal. For example, photoreceiver 24A may produce a stronger electrical signal (i.e., greater current magnitude) in response to receiving a stronger (e.g., greater power) optical signal. Additionally, in some cases, photoreceiver 24A may produce the electrical signal to reflect the one or more frequency values corresponding to the received optical signal. In other words, processing circuitry (e.g., processing circuitry 30) may analyze the electrical signal to determine the one or more frequency values corresponding to the optical signal. Photoreceiver 24A may include semiconductor materials such as any combination of Indium Gallium Arsenide, Silicon, Silicon Carbide, Silicon Nitride, Gallium Nitride, Germanium, or Lead Sulphide. In some examples, photoreceiver 24B is substantially similar to photoreceiver 24A.

Feedback units 26 may each include a set of circuit components for processing electrical signals. In some examples, the set of circuit components included in feedback unit 26A may include any combination of a band pass filter, a phase shifter, an electronic amplifier, and a voltage limiter. Such components may process, or filter, the electrical signal such that certain aspects of the electrical signal may be more efficiently measured (e.g., frequency values or intensity values). In the example of FIG. 1, feedback unit 26A may receive an electrical signal from photoreceiver 24A and output a processed electrical signal to EOM 22A and frequency counter 28A. In this way, feedback unit 26A acts as a part of a first positive feedback loop by processing an electrical signal which EOM 22A uses to modulate an optical signal emitted by light-emitting device 12, where the modulated optical signal passes through proof mass assembly 16 before arriving back at circuit 14 for processing by feedback unit 26A. Feedback unit 26B may be substantially similar to feedback unit 26A in that feedback unit 26B receives an electrical signal from photoreceiver 24B, and delivers a processed electrical signal to frequency counter 28B and EOM 22B. As such, feedback unit 26B operates within a second feedback loop in a similar manner to which feedback unit 26A operates within the first feedback loop.

In some examples, frequency counters 28 are circuit components that are each configured for measuring a frequency of an electrical signal. For example, frequency counter 28A may determine one or more frequency values corresponding to the processed electrical signal produced by feedback unit 26A. Frequency counter 28A may measure frequency values corresponding to the processed electrical signal in real-time or near real-time, such that frequency counter 28A tracks the frequency values as a function of time. Frequency counter 28B may be substantially similar to frequency counter 28A, except frequency counter 28B receives an electrical signal from feedback unit 26B rather than from feedback unit 26A.

Processing circuitry 30, and circuit 14 generally, may include one or more processors that are configured to implement functionality and/or process instructions for execution within accelerometer system 10. For example, processing circuitry 30 may be capable of processing instructions stored in a storage device (not illustrated in FIG. 1). Processing circuitry 30 may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, processing circuitry 30 may include any suitable structure, whether in hardware, software, firmware, or any combination thereof, to perform the functions ascribed herein to processing circuitry 30.

Proof mass assembly 16 may include a proof mass, a frame, a set of tethers, and a set of DETF structures. The proof mass, in some examples, is suspended within the frame by the set of tethers and the set of DETF structures. For example, the set of DETF structures may suspend the proof mass in a first direction relative to the frame. Additionally, the set of tethers may suspend the proof mass in a second direction and a third direction relative to the frame. The first direction, the second direction, and the third direction may represent three axes (e.g., x-axis, y-axis, and z-axis) of a Cartesian space. In some cases, the set of DETF structures enable the proof mass to be displaced in the first direction. Additionally, in some cases, the set of tethers prevent the proof mass from being displaced in the second direction and the third direction. In this way, proof mass assembly 16 may only allow the proof mass to be displaced along a single axis (e.g., a displacement axis). Since the displacement of the proof mass may determine the acceleration measured by circuit 14, accelerometer system 10 may be configured to determine the acceleration relative to the displacement axis.

In some examples, the first positive feedback loop (e.g., device 12, proof mass assembly 16, EOM 22A, photoreceiver 24A, feedback unit 26A, and frequency counter 28A) and the second positive feedback loop (e.g., light-emitting device 12, proof mass assembly 16, EOM 22B, photoreceiver 24B, feedback unit 26B, and frequency counter 28B) are configured to independently determine an acceleration value representative of an acceleration of an object including accelerometer system 10. For example, light-emitting device 12 may emit an optical signal, EOM 22A may modulate the optical signal to obtain a first modulated optical signal, and EOM 22A may transmit the first modulated optical signal to proof mass assembly 16. Photoreceiver 24A may receive the first modulated optical signal from proof mass assembly 16, where properties of the first modulated optical signal received by photoreceiver 24A may be affected by mechanical vibrations of a first DETF structure of proof mass assembly 16. Photoreceiver 24A converts the first modulated optical signal into a first electrical signal and transmits the first electrical signal to feedback unit 26A. In some examples, feedback unit 26A processes the first electrical signal to obtain a first processed electrical signal. For example, feedback unit 26A may use any combination of a first band pass filter, a first phase shifter, a first electronic amplifier, and a first voltage limiter to process the first electrical signal. Frequency counter 28A may receive the first processed electrical signal and determine a first frequency value corresponding to the first processed electrical signal. In some cases, the first frequency value represents a mechanical vibration frequency of the first DETF structure of proof mass assembly 16, which carries the first modulated optical signal ultimately received by photoreceiver 24A.

In addition to transmitting the first processed electrical signal to frequency counter 28A, feedback unit 26A may transmit the first processed electrical signal to EOM 22A. In turn, EOM 22A may modulate the optical signal emitted by light-emitting device 12 based on the first processed electrical signal, where the first modulated optical signal is transmitted to photoreceiver 24A via the first DETF structure of proof mass assembly 16, thus completing the first positive feedback loop. As such, a future mechanical vibration frequency of the first DETF structure depends, at least in part, on a current mechanical vibration frequency of the first DETF structure.

Additionally, in some examples, the second positive feedback loop may determine a second frequency value. For example, light-emitting device 12 may emit an optical signal, EOM 22B may modulate the optical signal to obtain a second modulated optical signal, and EOM 22B may transmit the second modulated optical signal to proof mass assembly 16. Photoreceiver 24B may receive the second modulated optical signal from proof mass assembly 16, where properties of the second modulated optical signal received by photoreceiver 24B may be affected by mechanical vibrations of a second DETF structure of proof mass assembly 16. Photoreceiver 24B converts the second modulated optical signal into a second electrical signal and transmits the second electrical signal to feedback unit 26B. In some examples, feedback unit 26B processes the second electrical signal to obtain a second processed electrical signal. For example, feedback unit 26B may use any combination of a second band pass filter, a second phase shifter, a second electronic amplifier, and a second voltage limiter to process the second electrical signal. Frequency counter 28B may receive the second processed electrical signal and determine a second frequency value corresponding to the second processed electrical signal. In some cases, the second frequency value represents a mechanical vibration frequency of the second DETF structure of proof mass assembly 16, which carries the second modulated optical signal ultimately received by photoreceiver 24B.

In addition to transmitting the second processed electrical signal to frequency counter 28B, feedback unit 26B may transmit the second processed electrical signal to EOM 22B. In turn, EOM 22B may modulate the optical signal emitted by light-emitting device 12 based on the second processed electrical signal, where the second modulated optical signal is transmitted to photoreceiver 24B via the second DETF structure of proof mass assembly 16, thus completing the second positive feedback loop. As such, a future mechanical vibration frequency of the second DETF structure depends, at least in part, on a current mechanical vibration frequency of the second DETF structure.

Processing circuitry 30 may be configured to calculate, based on the first frequency value, a first acceleration value. In some examples, to calculate the first acceleration value, processing circuitry 30 may subtract a baseline frequency value from the first frequency value to obtain a first frequency difference value. The baseline frequency value may represent a resonant mechanical frequency of the first DETF structure of proof mass assembly 16 while the proof mass is not displaced from a resting point along the proof mass displacement axis. In other words, the modulated optical signal emitted by EOM 22A may induce the first DETF structure to vibrate at the baseline frequency value while the proof mass is not displaced from the resting point along the proof mass displacement axis. As such, when the object is not accelerating, the first frequency difference value may be equal to zero since the first acceleration value—which represents the mechanical frequency of the first DETF structure—is equal to the baseline frequency value when the proof mass is not displaced (i.e., the object carrying accelerometer system 10 is not accelerating). The first frequency difference value, in some examples, may be correlated with an acceleration of the object. In other words, an increase of a magnitude of the first frequency difference value may indicate an increase in the acceleration of the object and a decrease of a magnitude of the first frequency difference value may indicate decrease in the acceleration of the object.

Additionally, processing circuitry 30 may be configured to calculate a second acceleration value based on the second acceleration value. In some examples, to calculate the second acceleration value, processing circuitry 30 may subtract a baseline frequency value from the second frequency value to obtain a second frequency difference value. The second frequency difference value, in some examples, may be correlated with an acceleration of the object. In other words, an increase of a magnitude of the second frequency difference value may indicate an increase in the acceleration of the object and a decrease of a magnitude of the second frequency difference value may indicate decrease in the acceleration of the object. The first acceleration value and the second acceleration value, which are calculated by processing circuitry 30, may, in some cases, be approximately equal.

It may be desirable for accelerometer system 10 to possess a high sensitivity in order to improve a quality of the acceleration values measured by accelerometer system 10 and/or increase a range of acceleration values in which accelerometer system 10 can accurately determine. To increase a level of sensitivity in accelerometer system 10, it may be beneficial to increase a mechanical quality factor of the DETF structures of proof mass assembly 16 (i.e., decrease an amount of damping which occurs while the DETF structures vibrate), increase a power of the optical signal emitted by light-emitting device 12, or any combination thereof. One way to increase the mechanical quality factor of the DETF structures is to decrease a pressure within a space in which the DETF structures are located. More specifically, to achieve a high mechanical quality factor, it may be beneficial to house the DETF structures in a vacuum or a near-vacuum environment. However, in some cases, housing the DETF structures in a vacuum or a near-vacuum environment while increasing the power of the optical signal emitted by light-emitting device 12 may cause components of accelerometer system 10 to heat up, and the optical signal may exhibit frequency nonlinearities caused by thermal effects—not by acceleration. Such nonlinearities may cause distortions in the accelerometer data which may be referred to as optical "shark fin" distortions, and the distortions may negatively affect the accuracy of the accelerometer data.

In some examples, housing 32 encloses light-emitting device 12, circuit 14, and proof mass assembly 16. Housing 32, in some examples, includes a crystalline material such as Silicon. Additionally, in some examples, housing 32 includes a first layer including an amorphous solid material and a second layer including a crystalline material.

In some examples, housing 32 encloses Helium gas. The Helium gas, in some cases, defines a partial pressure within a range between 0.1 torr and 760 torr. In some examples, it may be beneficial for the Helium gas to define a partial pressure within a range between 0.1 torr and 1 torr. The Helium gas may have a low enough pressure such that the mechanical quality factor of the DETF structures is not adversely affected. Since Helium has a very low atomic mass (i.e., 4.03 atomic mass units (amu)), Helium may have a relatively small effect on the mechanical quality factor of the DETF structures. Additionally, since Helium possesses a very high heat capacity (i.e., 5.19 Joules/(gram*° C.) (J/g° C.) at 20° C.), the Helium gas may effectively absorb the heat which is introduced by the optical signal. As such, in examples in which housing 32 encloses Helium gas, the pressure around the DETF structures and the power of the optical signal emitted by light-emitting device 12 may be reconciled such that the sensitivity of accelerometer system 10 is improved.

In some examples, housing 32 encloses Hydrogen gas. The Hydrogen gas, in some cases, defines a partial pressure within a range between 0.1 torr and 760 torr. In some examples, it may be beneficial for the Hydrogen gas to define a partial pressure within a range between 0.1 torr and 1 torr. The Hydrogen gas may have a low enough pressure such that the mechanical quality factor of the DETF structures is not adversely affected. Since Hydrogen has a very low atomic mass (i.e., 1.01 amu), Hydrogen may have a relatively small effect on the mechanical quality factor of the DETF structures. Additionally, since Hydrogen possesses a very high heat capacity (i.e., 14.32 Joules/(gram*° C.) (J/g° C.) at 20° C.), the Hydrogen gas may effectively absorb the heat which is introduced by the optical signal. As such, in examples in which housing 32 encloses Hydrogen gas, the pressure around the DETF structures and the power of the optical signal emitted by light-emitting device 12 may be reconciled such that the sensitivity of accelerometer system 10 is improved.

In some examples, a mechanical quality factor associated with the DETF structures is within a range between 5,000 and 2,000,000. In some examples, light-emitting device 12 emits the optical signal at a power value within a range between 1 nanowatt (nW) and 10,000 nW.

In some examples, accelerometer system 10 includes an opto-mechanical vibrating beam accelerometer as a self-oscillating electro-opto-mechanical oscillator. Two pairs of nanoscale dielectric beams may form a pair of DETF structures that rigidly anchor a thin film proof mass to a frame. Each DETF structure of the pair of DETF structures may have an optical resonance with a spectral width within a range bounded inclusively by 0.05 nanometers (nm) and 1 nm (e.g., 0.1 nm). In some examples, the DETF structures may be excited and driven by the optical signal emitted by light-emitting device 12, where the optical signal is coupled into an optically active portion of the DETF structures via a waveguide. Mechanical motion of the DETF structures, driven by the amplitude-modulated optical signal, may have a reciprocal effect on the optical signal in that the mechanical motion modulates the optical signal. In other words, an optical signal may both induce mechanical vibration in the DETF structures and measure a mechanical vibration frequency of the DETF structures corresponding to the vibration caused by the optical signal.

The optical signal may be outcoupled from the DETF structures. In some examples, the laser field is reflected out of the DETF structures. In other examples, the optical signal passes through the DETF structures in transmission and the optical signal is incident on photoreceivers 24 with suitable bandwidth to detect an Alternating Current (AC) photocurrent at the modulation frequency of the optical signal. The electrical signals produced by photoreceivers 24 are conditioned by the feedback electronics (e.g., filtered, amplified, phase shifted, and voltage limited) and the electrical signals are output to respective drive ports of EOMs 22 to modulate the optical signal. In this way, accelerometer system 10 may realize closed loop electro-opto-mechanical self-oscillation at a mechanical resonance frequency (e.g., 1.33 megahertz (MHz)) under standard conditions of positive feedback with 0 degrees phase shift and 0 dB round-trip signal gain. Accelerations experienced by accelerometer system 10 may cause minute displacements of the proof mass of proof mass assembly 16, generating stresses in the DETF structures which shift mechanical resonance frequencies of the DETF structures—higher for tensile stresses, lower for compressive stresses. As such, an instantaneous frequency of each DETF structure may be monitored by counting the frequency of a respective electrical signal using a frequency counters 28. To generate an acceleration value, processing circuitry 30 may, in some examples, apply scale factors to measured frequency shifts in mechanical vibrating frequencies of the DETF structures.

Figure 2:
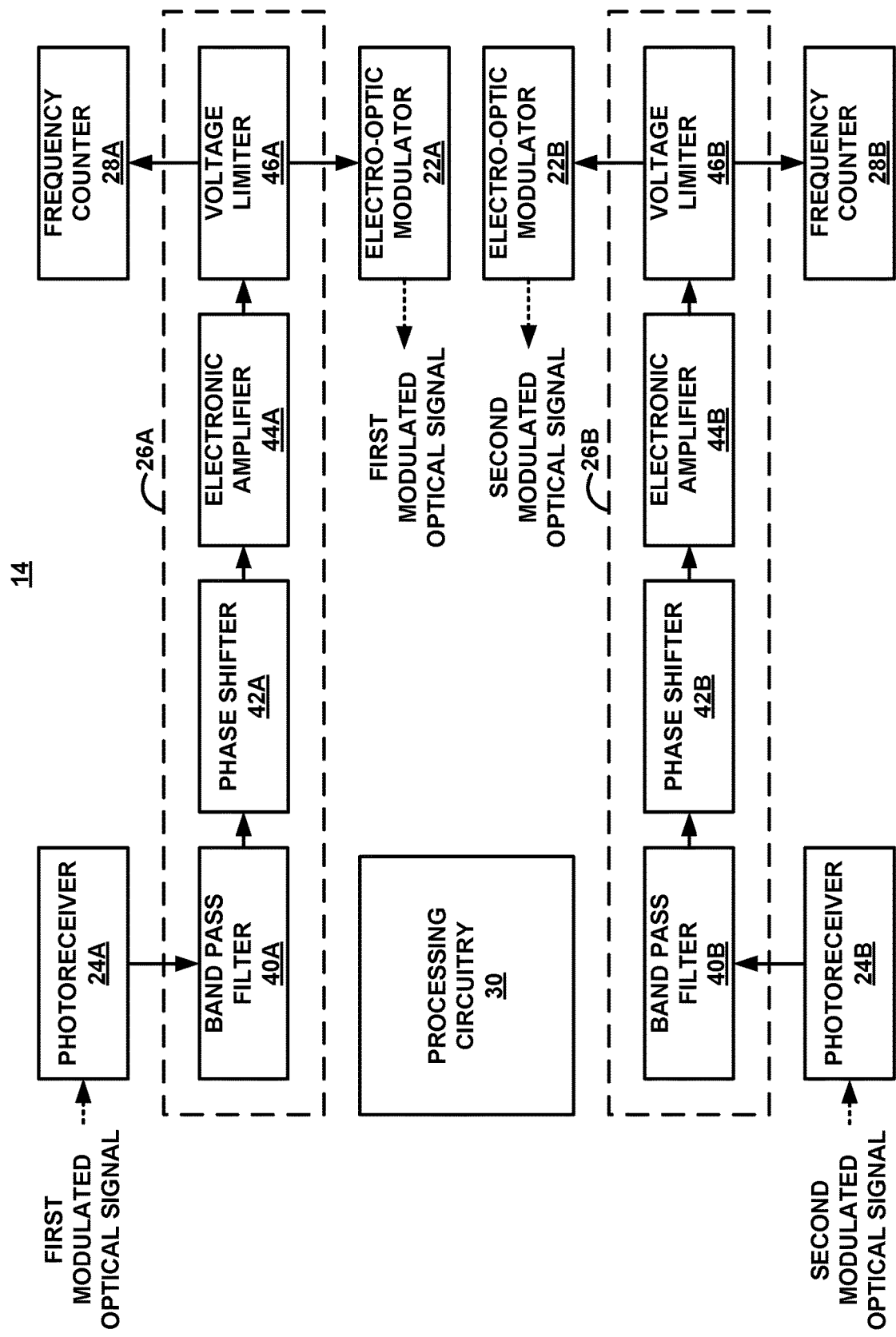
FIG. 2 is a block diagram illustrating the circuit of FIG. 1, in accordance with one or more techniques of this disclosure.

FIG. 2 is a block diagram illustrating circuit 14 of FIG. 1, in accordance with one or more techniques of this disclosure. As illustrated in FIG. 1, circuit 14 includes EOMs 22, photoreceivers 24, feedback units 26, frequency counters 28, and processing circuitry 30. Feedback units 26 include band pass filters 40A, 40B (collectively, "band pass filters 40"), phase shifters 42A, 42B (collectively, "phase shifters 42"), electronic amplifiers 44A, 44B (collectively, "electronic amplifiers 44), and voltage limiters 46A, 46B (collectively, "voltage limiters 46). The first feedback loop includes band pass filter 40A, phase shifter 42A, electronic amplifier 44A, and voltage limiter 46A). The second feedback loop includes band pass filter 40B, phase shifter 42B, electronic amplifier 44B, and voltage limiter 46B.

In some examples, circuit 14 may be configured to configured to receive modulated optical signals from proof mass assembly 16, convert the optical signals into electrical signals, process the electrical signals, analyze the processed electrical signals to determine acceleration values, and use the processed electrical signals to modulate optical signals, thus completing the first feedback loop and the second feedback loop. For example, photoreceiver 24A may receive a first modulated optical signal from a first DETF structure of proof mass assembly 16. The first modulated optical signal may include a frequency component associated with the first DETF structure itself, such as a vibration frequency of the first DETF structure. Photoreceiver 24A may convert the first modulated optical signal into a first electrical signal, preserving the frequency component indicative of the vibration frequency of the first DETF structure. Photoreceiver 24 may transmit the first electrical signal to feedback unit 26A, which includes band pass filter 40A, phase shifter 42A, electronic amplifier 44A, and voltage limiter 46A.

Band pass filter 40A may be an electronic filter that attenuates frequencies outside of a frequency range and "passes" frequencies within the frequency range. In some examples, band pass filter 40A includes any combination of passive filters, active filters, infinite impulse response (IIR) filters, finite impulse response (FIR) filters, Butterworth filters, Chebyshev filters, elliptic filters, Bessel filters, Gaussian filters, Legendre filters, or Linkwitz-Riley filters. In some examples, band pass filter 40A includes a combination of a high pass filter which passes frequencies above a high pass cutoff point and a low pass filter which passes frequencies below a low pass cutoff point. In some cases, band pass filter 40A passes frequencies within a range between 100 kilohertz (kHz) and 10,000 kHz. Additionally, phase shifter 42A may be configured to shift a phase of the first electrical signal. Phase may be characterized as a position of an instant on a waveform cycle of a periodic waveform. For example, the first electrical signal may include periodic waveforms which represent frequency components of the first electrical signal. A maximum peak of a sine wave for example, may be at a different phase than a minimum peak, or a zero crossing of the sine wave. In some examples, phase shifter 42A may "delay" the first electrical signal by a time value in order to shift a timeline in which frequency components of the first electrical signal oscillate.

Electronic amplifier 44A may amplify the first electrical signal such that an amplitude of the first electrical signal is increased by a gain factor. In other words, electronic amplifier 44A may increase a power of the first electrical signal. By amplifying the first electrical signal using electronic amplifier 44A, circuit 14 may improve an ability of processing circuitry 30 to analyze the first electrical signal, and modulate the optical signal emitted by light-emitting device 12 using EOM 22A. Electronic amplifier 44A may include, in some cases, power amplifiers, operational amplifiers, or transistor amplifiers, or any combination thereof. Additionally, in some examples, Voltage limiter 46A is configured to limit a voltage of the first electrical signal to a maximum voltage value. In other words, voltage limiter 46A may prevent the first electrical signal from exceeding the maximum voltage value, meaning that the first processed electrical signal produced by feedback unit 26A may not exceed the maximum voltage value.

In some examples, the first electrical signal may pass through feedback unit 26A in an order from band pass filter 40A, to phase shifter 42A, to electronic amplifier 44A, to voltage limiter 46A, as illustrated in FIG. 1. However, the order illustrated in FIG. 1 is not meant to be limiting. Band pass filter 40A, phase shifter 42A, electronic amplifier 44A, and voltage limiter 46A may be arranged to process the first electrical signal in any valid order.

In some examples, feedback unit 26A may transmit the first processed electrical signal to frequency counter 28A. Frequency counter 28A may determine a first frequency value, and processing circuitry 30 may determine a first acceleration value based on the first frequency value. Additionally, feedback unit 26A may transmit the first processed electrical signal to EOM 22A and EOM 22A may modulate the optical signal emitted by light-emitting device 12 based on the first processed electrical signal. In this way, proof mass assembly 16, photoreceiver 24A, band pass filter 40A, phase shifter 42A, electronic amplifier 44A, voltage limiter 46A, EOM 22A, and frequency counter 28A are a part of the first positive feedback loop which produces the first acceleration value associated with the object including accelerometer system 10.

In some examples, the components of feedback unit 26B (e.g., band pass filter 40B, phase shifter 42BN, electronic amplifier 44B, and voltage limiter 46B) may be substantially similar to the respective components of feedback unit 26A. As such, the second positive feedback loop may be substantially similar to the first positive feedback loop.

Figure 3:
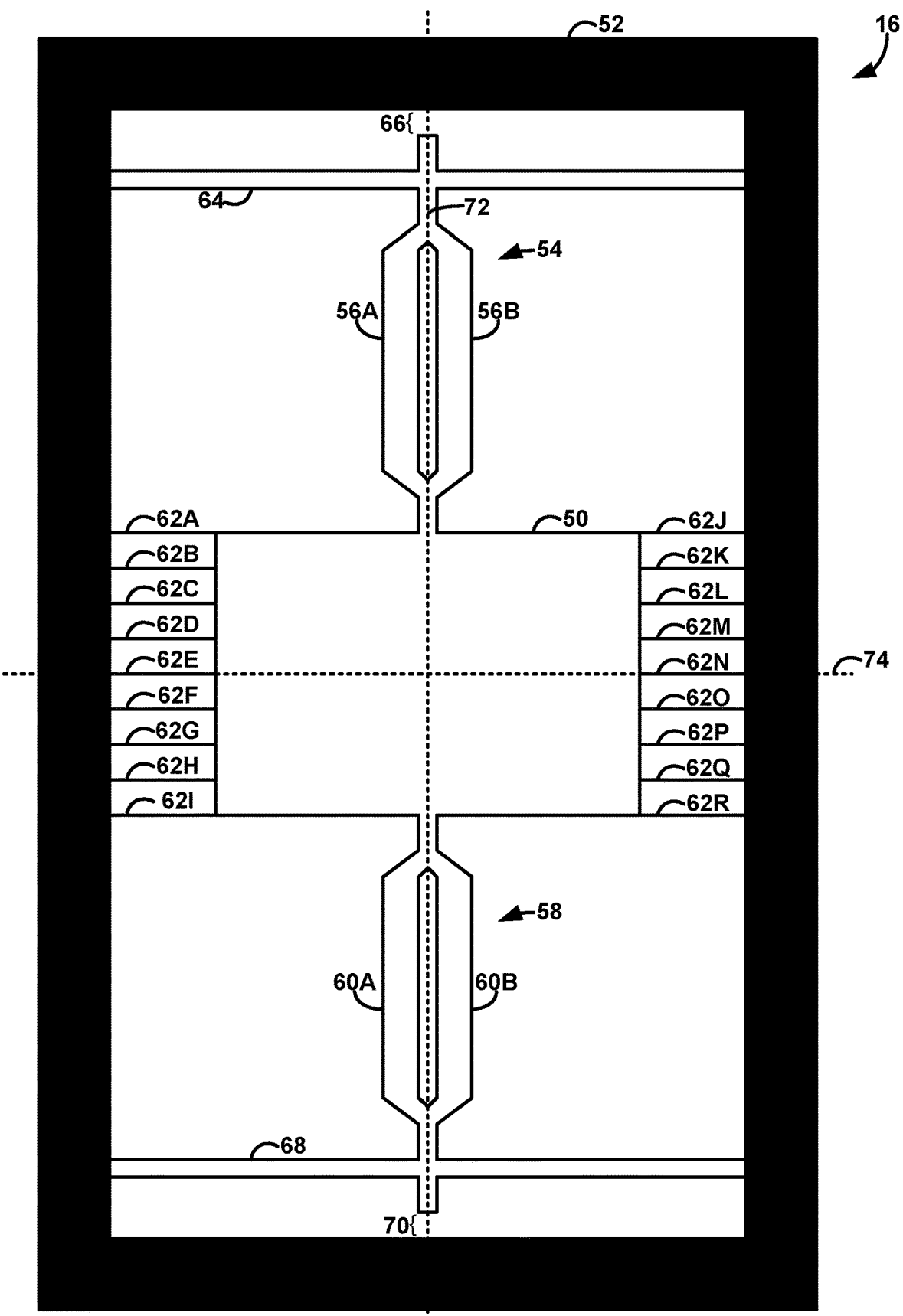
FIG. 3 illustrates a conceptual diagram of the proof mass assembly of FIG. 1 including a proof mass suspended within a frame by a first doubled ended tuning fork (DETF) structure, a second DETF structure, and a set of tethers, in accordance with one or more techniques of this disclosure.

FIG. 3 illustrates a conceptual diagram of proof mass assembly 16 including a proof mass 50 suspended within a frame 52 by a first DETF structure 54, a second DETF structure 58, and a set of tethers 62A-62R, in accordance with one or more techniques of this disclosure. As illustrated in FIG. 3, proof mass assembly 16 includes proof mass 50, frame 52, first DETF structure 54 including a first pair of mechanical beams 56A, 56B (collectively, "first pair of mechanical beams 56"), second DETF structure 58 including a second pair of mechanical beams 60A, 60B (collectively, "second pair of mechanical beams 60"), tethers 62A-62R (collectively, "tethers 62"), first distal tine 64, and second distal tine 68. Proof mass assembly 16 is aligned relative to proof mass displacement axis 72 and proof mass resting plane 74, as illustrated in FIG. 3.

Proof mass assembly 16 is a mechanical component of electro-opto-mechanical accelerometer system 10. Since accelerometer system 10 measures acceleration, which is a rate in which a velocity of an object changes over time, it may be beneficial to include proof mass assembly 16 so that acceleration can be measured based on a physical object such as proof mass 50. For example, accelerometer system 10, which includes proof mass assembly 16 may be fixed to or included within an object. Consequently, as the object accelerates at an acceleration value, proof mass assembly 16 may also accelerate at the acceleration value. Acceleration may affect a position of proof mass 50 within frame 52 relative to proof mass displacement axis 72 and proof mass resting plane 74. For example, non-zero acceleration may cause proof mass 50 to be displaced from proof mass resting plane 74 along proof mass displacement axis 72. As described herein, if proof mass 50 is "displaced," a center of mass of proof mass 50 is displaced relative to frame 52. Increasing a magnitude of acceleration may cause the displacement of proof mass 50 along proof mass displacement axis 72 to increase. Additionally, decreasing a magnitude of acceleration may cause the displacement of proof mass 50 along proof mass displacement axis 72 to decrease.

In some examples, proof mass 50 take the form of a patterned thin film, where the thin film has a mass within a range between 100 nanograms (ng) and 10,000 ng. Additionally, in some cases, the thin film has a thickness within a range between 1 nm and 5,000 nm. Proof mass 50 may be suspended within frame 52 along proof mass displacement axis 72 by first DETF structure 54 and second DETF structure 58 (collectively, "DETF structures 54, 58"). First DETF structure 54 and second DETF structure 58 may each have a high level of stiffness. For example, a scale factor of each of first DETF structure 54 and second DETF structure 58 may be within a range between 0.1 parts per million per gram (ppm/g) and 10 ppm/g. In this way, proof mass assembly 16 may include a very light proof mass 50 which is secured by very stiff DTEF structures 54, 58. As such, a very high acceleration (e.g., 100,000 m/s$^2$) may cause proof mass 50 to be displaced along the proof mass displacement axis 72 by a very small displacement value, for example. In some examples, proof mass 50 is displaced along the proof mass displacement axis 72 by a displacement value of up to 100 nm.

In order to generate acceleration values indicative of the acceleration of the object in which accelerometer system 10 is fixed to, accelerometer system 10 may quantify, using optical signals, the displacement of proof mass 50 within frame 52. To quantify the displacement of proof mass 50, accelerometer system 10 may measure and analyze mechanical properties of DETF structures 54, 58, such as mechanical vibrating frequency values corresponding to DETF structures 54, 58. Indeed, since DETF structures 54, 58 suspend proof mass 50, the mechanical vibrating frequencies of DETF structures 54, 58 may be affected due to a displacement of proof mass 50. For example, a displacement of proof mass 50 towards first DETF structure 54 and away from second DETF structure 58 may cause proof mass 50 to apply a compression force to first DETF structure 54 and apply a tension force to second DETF structure 58. Such a compression force may cause the mechanical vibration frequency of first DETF structure 54 to decrease and such a tension force may cause the mechanical vibration force of second DETF structure 58 to increase. Changes in the mechanical vibration frequencies of DETF structures 54, 58 may, in some examples, be proportional to the displacement of proof mass 50 relative to frame 52 in the direction of proof mass displacement axis 72. In some examples, Accelerometer system 10 may measure changes in the mechanical vibration frequencies of DETF structures 54, 58 by transmitting modulated optical signals through DETF structures 54, 58.

First DETF structure 54 may include, for example, the first pair of mechanical beams 56 separated by a gap. The first pair of mechanical beams 56 may include photonic crystal mechanical beams that are configured for carrying a first modulated optical signal while first DETF structure 54 is oscillating at a first mechanical vibrating frequency. In some cases, the first modulated optical signal is emitted by light-emitting device 12 (illustrated in FIG. 1), and the first modulated optical signal itself induces vibration in first DETF structure 54. Additionally, the vibration of the first DETF structure 54 may affect certain properties of the first modulated optical signal such that the mechanical vibrating frequency of the first DETF structure 54 is reflected in the first modulated optical signal. In this way, the first modulated optical signal may cause the mechanical vibration in the first DETF structure 54 and enable accelerometer system 10 to measure the mechanical vibration frequency of the first DETF structure 54 based on the first modulated optical signal.

Additionally, second DETF structure 58 may include, for example, the second pair of mechanical beams 60 separated by a gap. The second pair of mechanical beams 60 may include photonic crystal mechanical beams that are configured for carrying a second modulated optical signal while second DETF structure 58 is oscillating at a second mechanical vibrating frequency. In some cases, the second modulated optical signal is emitted by light-emitting device 12 (illustrated in FIG. 1), and the second modulated optical signal itself induces vibration in second DETF structure 58. Additionally, the vibration of the second DETF structure 58 may affect certain properties of the second modulated optical signal such that the mechanical vibrating frequency of the second DETF structure 58 is reflected in the second modulated optical signal. In this way, the second modulated optical signal may cause the mechanical vibration to occur in the second DETF structure 58 and enable accelerometer system 10 to measure the mechanical vibration frequency of the second DETF structure 58 based on the second modulated optical signal.

Proof mass 50 may be fixed to frame 52 by tethers 62. In some examples, tethers 62 may suspend proof mass 50 in proof mass resting plane 74 such that the center of mass of proof mass 50 does not move within proof mass resting plane 74 relative to frame 52. Proof mass displacement axis 72 may represent a single axis (e.g., x-axis) of a Cartesian space, and proof mass resting plane 74 may represent two axes (e.g., y-axis and z-axis) of the Cartesian space. Since tethers 62 may restrict proof mass 50 from being displaced relative to proof mass resting plane 74, in some examples, proof mass 50 may only be displaced along the proof mass displacement axis 72. Accelerometer system 10 may measure an acceleration based on mechanical vibrating frequencies of DETF structures 54, 58, where the mechanical vibrating frequencies are related to an amount of displacement of proof mass 50 along proof mass displacement axis 72. In this way, the acceleration determined by accelerometer system 10 may be an acceleration relative to proof mass displacement axis 72.

First DETF structure 54 may include a proximal end that is proximate to proof mass 50, and a distal end that is separated from frame 52 by a first gap 66. First distal tine 64 may help to suspend first DETF structure 54 within frame 52 such that the first DETF structure 54 is perpendicular to proof mass resting plane 74. In some examples, first distal tine 64 extends perpendicularly to proof mass displacement axis 72 between two sidewalls of frame 52. An optical signal may travel through frame 52 via a first optical fiber (not illustrated in FIG. 3), the optical signal being coupled across first gap 66 to first DETF structure 54.

Second DETF structure 58 may include a proximal end that is proximate to proof mass 50, and a distal end that is separated from frame 52 by a second gap 70. Second distal tine 68 may help to suspend first DETF structure 58 within frame 52 such that the second DETF structure 58 is perpendicular to proof mass resting plane 74. In some examples, second distal tine 68 extends perpendicularly to proof mass displacement axis 72 between two sidewalls of frame 52. An optical signal may travel through frame 52 via a second optical fiber (not illustrated in FIG. 3), the optical signal being coupled across second gap 70 to second DETF structure 58.

Figure 4:
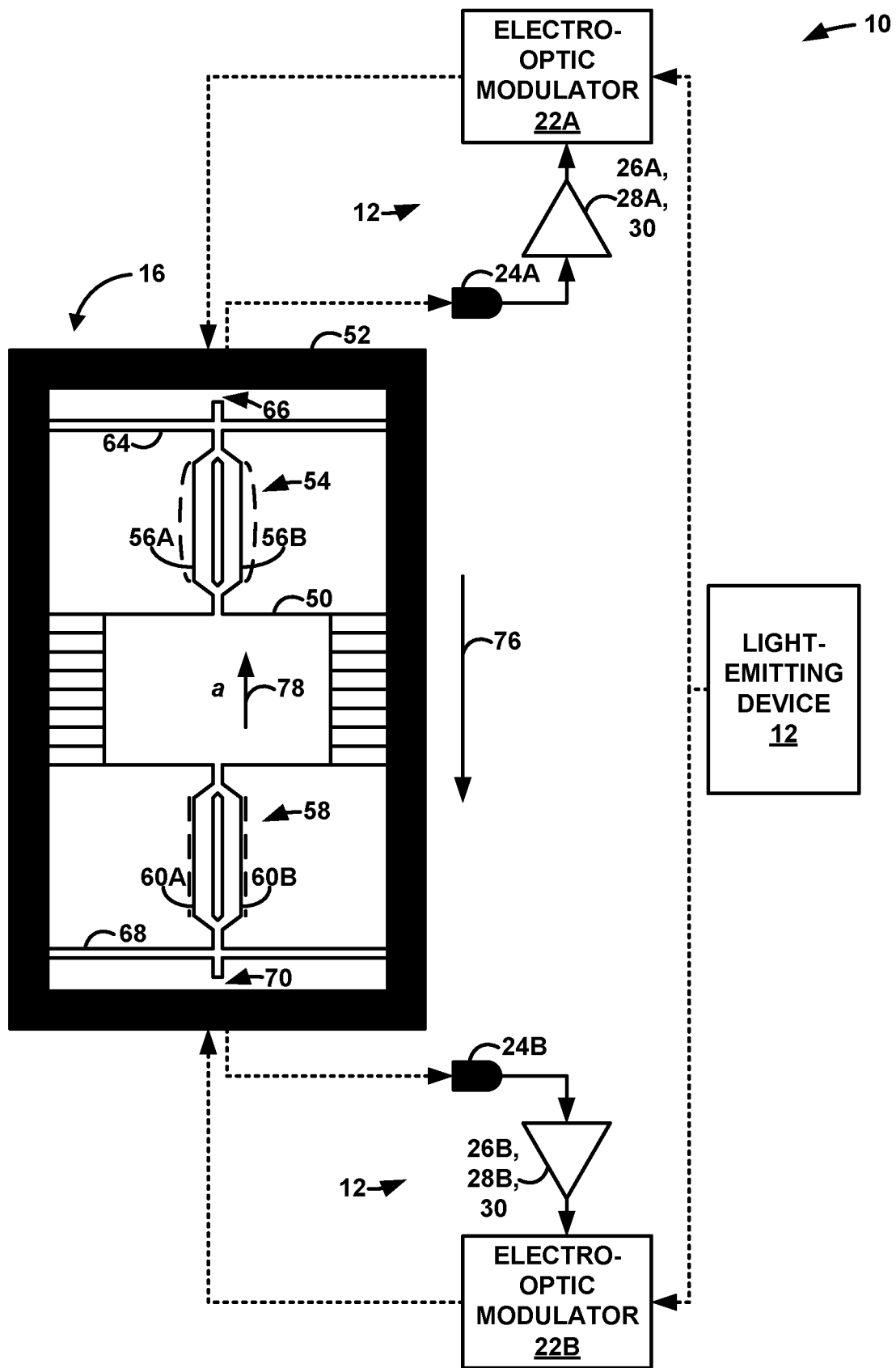
FIG. 4 illustrates a conceptual diagram of the accelerometer system of FIG. 1, in accordance with one or more techniques of this disclosure.

FIG. 4 illustrates a conceptual diagram of accelerometer system 10, in accordance with one or more techniques of this disclosure. The conceptual diagram of FIG. 4 includes light-emitting device 12, components of circuit 14, and proof mass assembly 16.

In some examples, an object may be fixed to accelerometer system 10. The object, in some cases, may accelerate. Accelerometer system 10, including proof mass assembly 16, may accelerate with the object. As proof mass assembly 16 accelerates, proof mass 50 may be displaced relative to frame 52. In the example illustrated in FIG. 4, if proof mass assembly 16 accelerates in direction 78, proof mass 50 is displaced in direction 78. Direction 78, in some examples, is aligned with a proof mass displacement axis (e.g., proof mass displacement axis 72 of FIG. 3. As proof mass 50 is displaced in direction 78 relative to frame 52, proof mass 50 applies a compression force to first DETF structure 54, and proof mass 50 applies a tension force to second DETF structure 58. Such forces may affect mechanical vibrating frequencies of DETF structures 54, 58, where mechanical vibration is induced in first DETF structure 54 and second DETF structure 58 by electro-optic modulator 22A and electro-optic modulator 22B, respectively. For example, the compression force applied to first DETF structure 54 may cause the mechanical vibration frequency of first DETF structure 54 to decrease, and the tension force applied to second DETF structure 58 may cause the mechanical vibration frequency of second DETF structure 58 to increase.

Light-emitting device 12 may emit an optical signal to EOMs 22. In turn, EOM 22A and EOM 22B may modulate the optical signal according to a first processed electrical signal produced by feedback unit 26A and a second processed electrical signal produced by feedback unit 26B, respectively. As such, EOM 22A produces a first modulated optical signal and EOM 22B produces a second modulated optical signal. EOM 22A, for example, may transmit the first modulated optical signal to proof mass assembly 16. The first modulated optical signal may cross frame 52. In some examples, frame 52 includes an aperture or another opening bridged by a first optical fiber which allows the first modulated optical signal to pass. Additionally, the first modulated optical signal may couple across first gap 66 to the first DETF structure 54. The first modulated optical signal may propagate through first DETF structure 54, inducing mechanical vibration in first DETF structure 54. In some examples, the first modulated optical signal propagates the length of first DETF structure 54 towards proof mass 50 along mechanical beam 56A and subsequently propagates the length of first DETF structure 54 away from proof mass 50 along mechanical beam 56B. In some examples, the first modulated optical signal propagates the length of first DETF structure 54 towards proof mass 50 along mechanical beam 56B and subsequently propagates the length of first DETF structure 54 away from proof mass 50 along mechanical beam 56A. In any case, by propagating the length of first DETF structure 54, the first modulated optical signal may retain information indicative of mechanical properties (e.g., the mechanical vibration frequency) of first DETF structure 54. After the first modulated optical signal propagates through first DETF structure 54, the first modulated optical signal may exit proof mass assembly 16 via first gap 66 and the first optical fiber of frame 52.

After exiting proof mass assembly 16, the first modulated optical signal may arrive at photoreceiver 24A. Photoreceiver 24A converts the first modulated optical signal into a first electrical signal, and feedback unit 26A processes the first electrical signal to produce a first processed electrical signal. Frequency counter 28A may determine a first frequency value corresponding to the first processed electrical signal, where the first frequency value is indicative of the mechanical vibrating frequency of the first DETF structure 54. Processing circuitry 30 may subtract a baseline frequency value from the first frequency value to obtain a first frequency difference value and calculate a first acceleration value based on the first frequency difference value. EOM 22A may use the first processed electrical signal to modulate the optical signal emitted by light-emitting device 12.

EOM 22B, for example, may transmit the second modulated optical signal to proof mass assembly 16. The second modulated optical signal may cross frame 52. In some examples, frame 52 includes an aperture or another opening bridged by a second optical fiber which allows the second modulated optical signal to pass. Additionally, the second modulated optical signal may couple across second gap 70 to the second DETF structure 58. The second modulated optical signal may propagate through second DETF structure 58, inducing mechanical vibration in second DETF structure 58. In some examples, the second modulated optical signal propagates the length of second DETF structure 58 towards proof mass 50 along mechanical beam 56A and subsequently propagates the length of second DETF structure 58 away from proof mass 50 along mechanical beam 56B. In some examples, the second modulated optical signal propagates the length of second DETF structure 58 towards proof mass 50 along mechanical beam 56B and subsequently propagates the length of second DETF structure 58 away from proof mass 50 along mechanical beam 56A. In any case, by propagating the length of second DETF structure 58, the second modulated optical signal may retain information indicative of mechanical properties (e.g., the mechanical vibration frequency) of second DETF structure 58. After the second modulated optical signal propagates through second DETF structure 58, the second modulated optical signal may exit proof mass assembly 16 via second gap 70 and the second optical fiber of frame 52.

After exiting proof mass assembly 16, the second modulated optical signal may arrive at photoreceiver 24B. Photoreceiver 24B converts the second modulated optical signal into a second electrical signal, and feedback unit 26A processes the second electrical signal to produce a second processed electrical signal. Frequency counter 28B may determine a second frequency value corresponding to the second processed electrical signal, where the second frequency value is indicative of the mechanical vibrating frequency of the second DETF structure 58. Processing circuitry 30 may subtract a baseline frequency value from the second frequency value to obtain a second frequency difference value and calculate a second acceleration value based on the second frequency difference value. EOM 22B may use the second processed electrical signal to modulate the optical signal emitted by light-emitting device 12.

Figure 5:
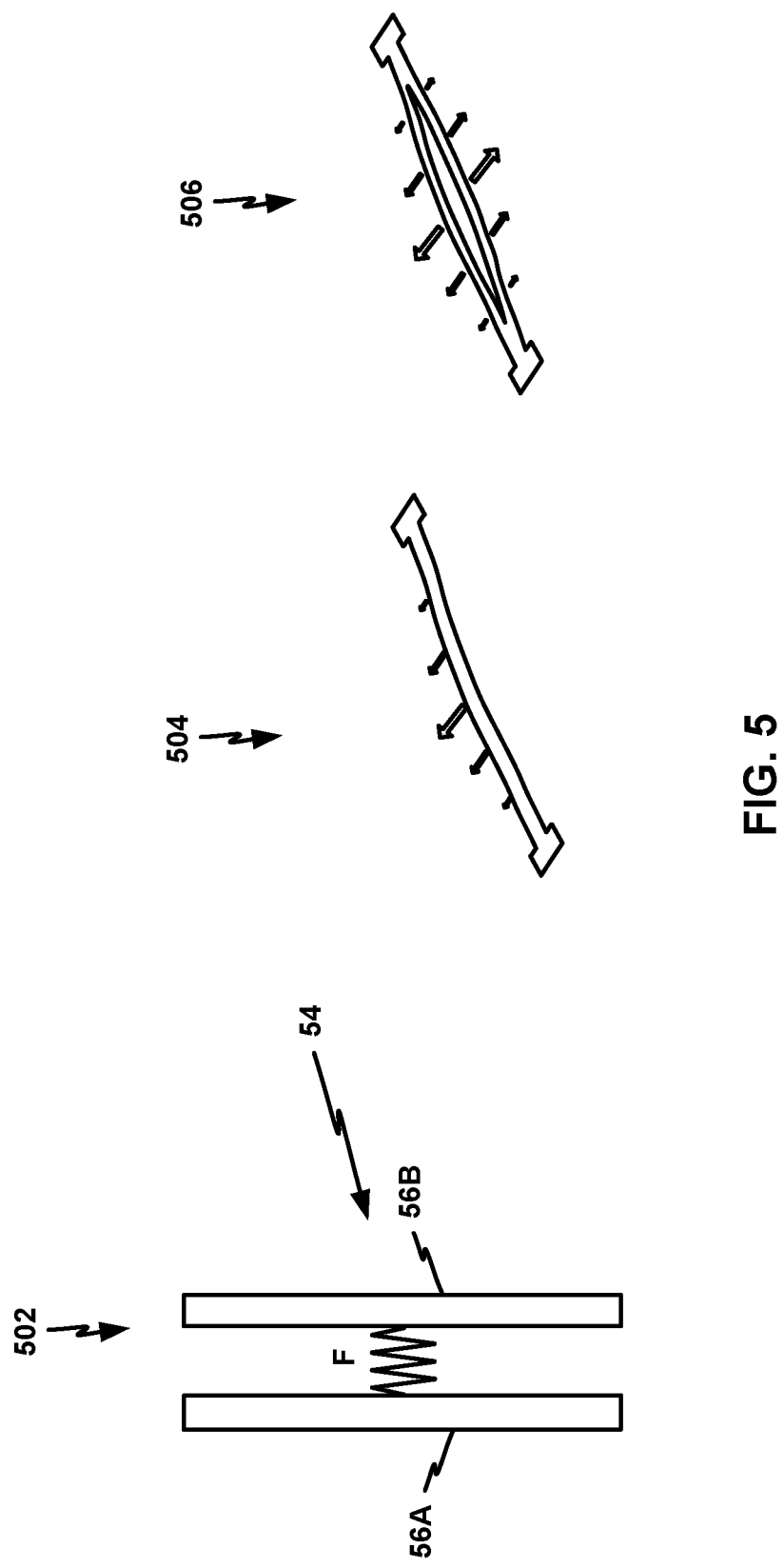
FIG. 5 depicts additional aspects of the accelerometer system of FIG. 1, in accordance with one or more techniques of this disclosure.

FIG. 5 depicts additional aspects of accelerometer system 10, in accordance with one or more techniques of this disclosure. For example, FIG. 5 illustrates the first DETF structure 54 including the first pair of mechanical beams 56. The optical signal emitted by light-emitting device 12 may induce a force between the first pair of mechanical beams 56, and the force may be modelled by a spring force. FIG. 5 illustrates a spring force provided by laser light between beams in an optical zipper in the gap between photonic crystal mechanical beams 56A, 56B of DETF structure 54 (402); a perspective view depiction of vibration modes in beams in an optical zipper in one common direction together (404); and a perspective view depiction of vibration modes in beams in an optical zipper in opposing directions of oscillation (406).

Figure 6:
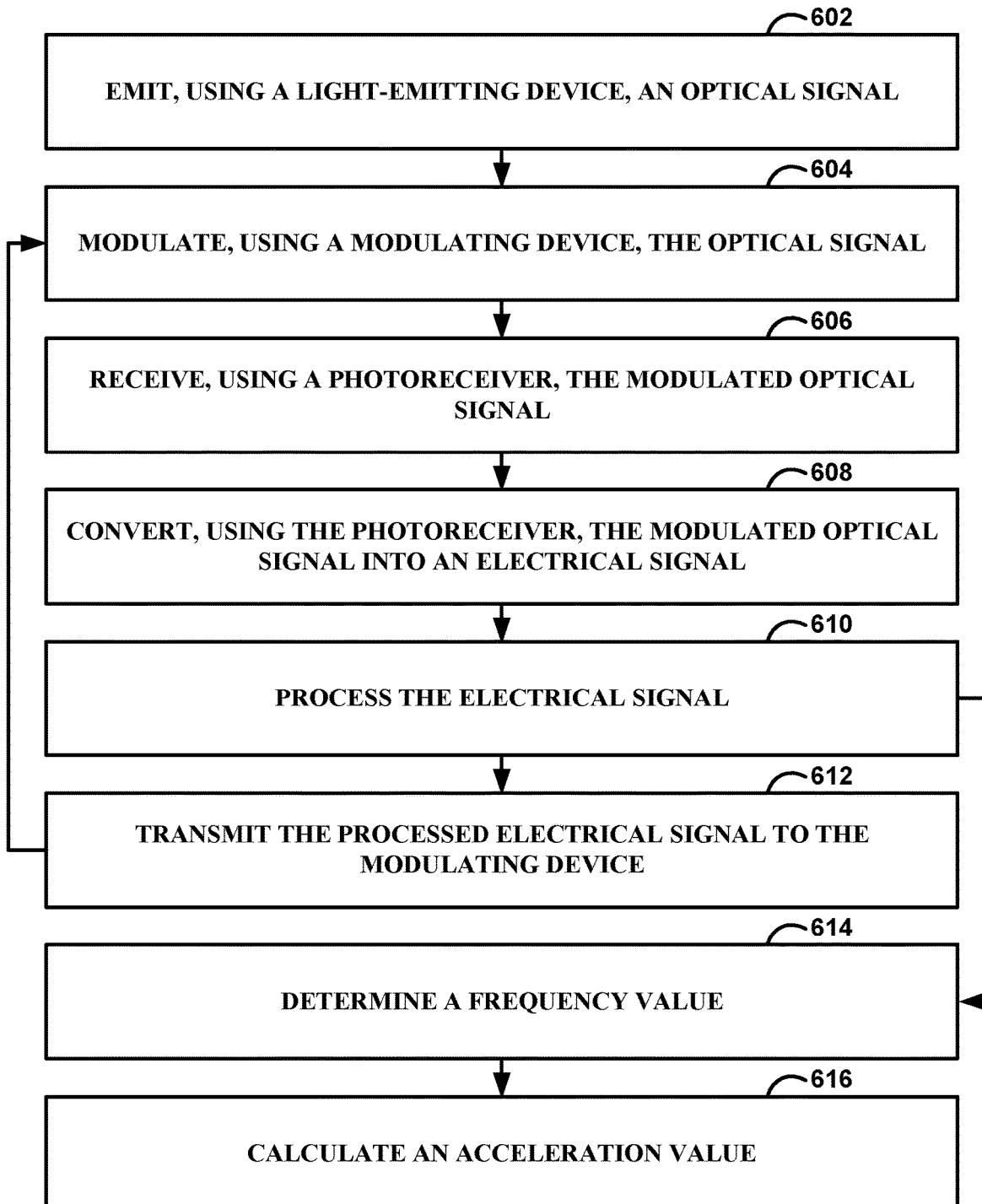
FIG. 6 is a flow diagram illustrating an example operation for determining a frequency value using a positive feedback loop, in accordance with one or more techniques of this disclosure.

FIG. 6 is a flow diagram illustrating an example operation for determining a frequency value using a positive feedback loop, in accordance with one or more techniques of this disclosure. For convenience, FIG. 6 is described with respect to light-emitting device 12, circuit 14, and proof mass assembly 16 of FIGS. 1-4. However, the techniques of FIG. 6 may be performed by different components of light-emitting device 12, circuit 14, and proof mass assembly 16 or by additional or alternative devices.

Accelerometer system 10, which includes light-emitting device 12, circuit 14, and proof mass assembly 16 is configured to, in some examples, measure an acceleration of an object in real-time or near real-time. In order to measure the acceleration, accelerometer system 10 is configured to measure a mechanical vibrating frequency of a DETF structure, the mechanical vibrating frequency being induced by an optical signal. An inertial navigation system may, in some examples, include accelerometer system 10. Based on the measured acceleration of an object over a period of time, the inertial navigation system may determine a position of the object over the period of time by performing a double integral of the acceleration over the period of time. In order to simplify the acceleration measurement, accelerometer system 10 may implement a positive feedback loop, as described with respect to the example operation of FIG. 6.

As illustrated in FIG. 6, light-emitting device 12 emits an optical signal (602). Light-emitting device 12 may, in some cases, include a laser device configured to emit photons. In some examples, light-emitting device 12 emits the photons at an optical power within a range between 0.1 microwatts ($\mu W$) and 10 $\mu W$. Light-emitting device 12 may transmit the optical signal to a modulating device of circuit 14, which modulates the optical signal (604). In some examples, the modulating device includes an electro-optic modulator, such as EOM 22A. In such examples, to modulate the optical signal, EOM 22A may increase an attenuation of the optical signal and decrease an attenuation of the optical signal for periods of time determined based on an electrical signal received by EOM 22A. After modulating the optical signal, the modulating device may, in some cases, transmit the modulated optical signal to proof mass assembly 16, and the modulated optical signal may propagate through first DETF structure 54 of proof mass assembly 16, inducing a mechanical vibration in proof mass assembly 16. In some examples, the induced mechanical vibration frequency affects properties of the modulated optical signal. For example, a mechanical vibration frequency of first DETF structure 54 may be reflected in the modulated optical signal after the modulated optical signal propagates through first DETF structure 54.

A photoreceiver (e.g., photoreceiver 24A) receives the modulated optical signal (606) after the modulated optical signal travels through first DETF structure 54. Additionally, photoreceiver 24A converts the modulated optical signal into an electrical signal (608). Photoreceiver 24A may be a semiconductor device configured to receive photons and convert the photons into electrical energy. When photoreceiver 24A generates the electrical signal, photoreceiver 24A may preserve properties of the optical signal, such as frequencies or intensity levels. For example, the mechanical vibration frequency of first DETF structure 54, which is reflected in the modulated optical signal, may also be reflected in the electrical signal generated by photoreceiver 24A. Additionally, in some examples, an intensity of the modulated optical signal may be reflected in the electrical signal. For example, a greater intensity level of the modulated optical signal may correspond to a greater current amplitude of the electrical signal, and a lower intensity level of the modulated optical signal may correspond to a lower current amplitude of the electrical signal.

Circuit 14 processes the electrical signal (610) using feedback unit 26A. In some examples, to process the electrical signal, feedback unit 26A uses band pass filter 40A, phase shifter 42A, electronic amplifier 44A, and voltage limiter 46A. Feedback unit 26A transmits the processed electrical signal to the modulating device (612), and the operation returns to block 604. As such, the modulating device modulates the optical signal generated by light-emitting device 12 using the processed electrical signal, which is influenced by the mechanical vibrating frequency of first DETF structure 54. This modulation completes a positive feedback loop, in that the modulated optical signal is created by the modulating device based on the processed electrical signal, which in turn is created by circuit 14 based on the modulated optical circuit. Additionally, the mechanical vibration of the first DETF structure 54, which is induced by the modulated optical signal may be influenced by the mechanical vibration frequency of the first DETF structure 54 itself, since the mechanical vibration frequency may drive the electrical signal, which in turn drives the modulated optical signal.

Frequency counter 28A determines a frequency value based on the processed electrical signal (614). In some examples, the frequency value may represent the mechanical vibration frequency of the first DETF structure 54. Based on the frequency value, processing circuitry 30 is configured to calculate an acceleration value (616). In some examples, processing circuitry 30 may calculate the acceleration value by subtracting a baseline frequency value from the frequency value to obtain a frequency difference value, where the baseline frequency value represents a mechanical vibration frequency of the first DETF structure 54 while proof mass 50 is not displaced (i.e., while acceleration is equal to 0 m/s$^2$). The frequency difference value may, in some examples, be correlated with acceleration. Based on the correlation, processing circuitry 30 may calculate the acceleration value using the frequency difference value. In some examples, processing circuitry 30 is configured to track the acceleration value over a period of time as the displacement of proof mass 50 changes. Processing circuitry 30 may, in some cases, store the acceleration values over the period of time in a memory.

Although the example operation of FIG. 6 is described with respect to the first positive feedback loop including, among other things, EOM 22A, photoreceiver 24A, feedback unit 26A, frequency counter 28A, and first DETF structure 54, in some examples, the example operation of FIG. 6 may be performed using the second positive feedback loop including, among other things, EOM 22B, photoreceiver 24B, feedback unit 26B, frequency counter 28B, and second DETF structure 58.

Figure 7:
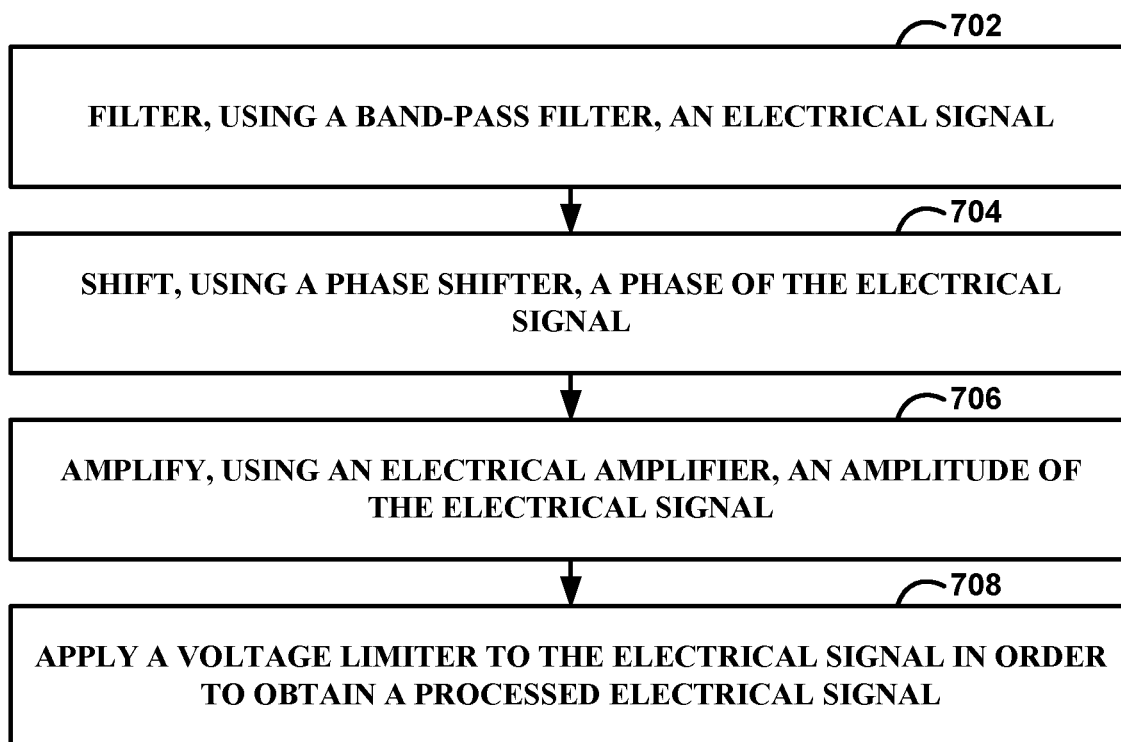
FIG. 7 is a flow diagram illustrating an example operation for processing an electrical signal, in accordance with one or more techniques of this disclosure.

FIG. 7 is a flow diagram illustrating an example operation for processing an electrical signal, in accordance with one or more techniques of this disclosure. For convenience, FIG. 7 is described with respect to light-emitting device 12, circuit 14, and proof mass assembly 16 of FIGS. 1-4. However, the techniques of FIG. 7 may be performed by different components of light-emitting device 12, circuit 14, and proof mass assembly 16 or by additional or alternative devices.

The example operation of FIG. 7 may represent an example operation to process the electrical signal (block 610) of FIG. 6. Band pass filter 40A filters the electrical signal (702) generated by 24A. Band pass filter 40A may be an electronic filter that attenuates frequencies outside of a frequency range and "passes" frequencies within the frequency range. Phase shifter 42A shifts a phase of the electrical signal (704). In some examples, phase shifter 42A may "delay" the electrical signal by a time value in order to shift a timeline in which frequency components of the electrical signal oscillate. Electronic Amplifier 44A amplifies an amplitude of the electrical signal (706). In other words, electronic amplifier 44A may increase a power of the electrical signal. Voltage limiter 46A limits the voltage of the electrical signal to obtain the processed electrical signal. In other words, voltage limiter 46A may prevent the electrical signal from exceeding the maximum voltage value, meaning that the processed electrical signal produced by feedback unit 26A may not exceed the maximum voltage value.

Although the example operation of FIG. 7 is described with respect to the first positive feedback loop including, among other things, band pass filter 40A, phase shifter 42A, electronic amplifier 44A, and voltage limiter 46A, in some examples, the example operation of FIG. 7 may be performed using the second positive feedback loop including, among other things, band pass filter 40B, phase shifter 42B, electronic amplifier 44B, and voltage limiter 46B.

Figure 8:
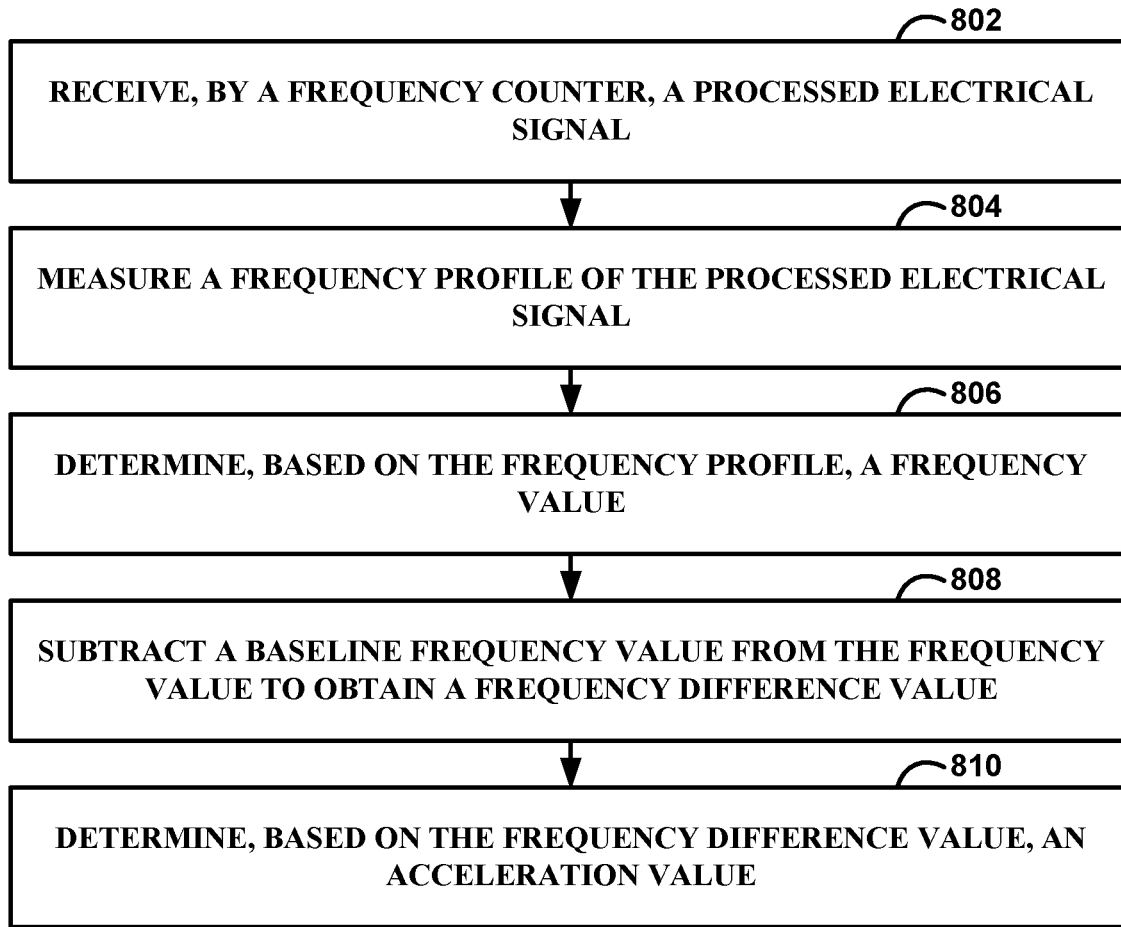
FIG. 8 is a flow diagram illustrating an example operation for calculating an acceleration value based on a frequency value measured by the accelerometer system of FIG. 1, in accordance with one or more techniques of this disclosure.

FIG. 8 is a flow diagram illustrating an example operation for calculating an acceleration value based on a frequency value measured by accelerometer system 10, in accordance with one or more techniques of this disclosure. For convenience, FIG. 8 is described with respect to light-emitting device 12, circuit 14, and proof mass assembly 16 of FIGS. 1-4. However, the techniques of FIG. 8 may be performed by different components of light-emitting device 12, circuit 14, and proof mass assembly 16 or by additional or alternative devices.

Frequency counter 28A receives a processed electrical signal (802). In some examples, the processed electrical signal may be processed, at least in part, by feedback unit 26A. After receiving the processed electrical signal, frequency counter 28A measures a frequency profile of the processed electrical signal (804) and determines, based on the frequency profile, a frequency value (806). In this way, frequency counter 28A may be configured to isolate the frequency value from the processed electrical signal, where the frequency value represents a mechanical vibrating frequency of first DETF structure 54. As the mechanical vibrating frequency of first DETF structure 54 changes, the frequency value may change commensurately, thus enabling accelerometer system 10 to identify changes in the mechanical vibrating frequency of first DETF structure 54 based on the processed electrical signal.

Processing circuitry 30 subtracts a baseline frequency value form the frequency value to obtain a frequency difference value (808). In some examples, the baseline frequency value represents a mechanical vibrating frequency of first DETF structure 54 when first DETF structure 54 is excited by an optical signal and proof mass 50 is not displaced along the proof mass displacement axis 72. When proof mass 50 is not displaced along the proof mass displacement axis 72, an acceleration of accelerometer system 10 may be zero. As such, the baseline frequency value may represent a mechanical vibration frequency of the first DETF structure 54 at zero acceleration. In some examples, the baseline frequency value may be within a range between 1 Megahertz (MHz) and 2 MHz. In some examples, the baseline frequency value is 1.33 MHz. Processing circuitry 30 determines, based on the frequency difference value, an acceleration value (810). Acceleration may, in some cases, have a linear relationship with the frequency difference value. In other words, a change in the frequency difference value may correspond to a commensurate change in acceleration.

Although the example operation of FIG. 7 is described with respect to the first positive feedback loop including, among other things, feedback unit 26A and frequency counter 28A, in some examples, the example operation of FIG. 7 may be performed using the second positive feedback loop including, among other things, feedback unit 26B and frequency counter 28B.

In one or more examples, the accelerometers described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors within the accelerometer or communicatively coupled to the accelerometer. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

What is claimed is:

1. An accelerometer system comprising:
   a light-emitting device configured to emit an optical signal; and
   a circuit configured to:
      modulate, by a modulating device, the optical signal to produce a modulated optical signal;
      output, by the modulating device to a double-ended tuning fork (DETF) structure, the modulated optical signal produced by the modulating device;
      receive, by a photoreceiver from the DETF structure, the modulated optical signal;
      convert, by the photoreceiver, the modulated optical signal into an electrical signal;
      process the electrical signal to obtain a processed electrical signal, wherein to process the electrical signal, the circuit is configured to:
         filter, using a band-pass filter, the electrical signal to attenuate frequency components of the electrical signal outside of a frequency band;
         shift, using a phase shifter, a phase of the electrical signal;
         amplify, using an electrical amplifier, an amplitude of the electrical signal; and
         apply a voltage limiter to the electrical signal to obtain the processed electrical signal;
      transmit the processed electrical signal to the modulating device, wherein the modulating device is configured to modulate the optical signal based on the processed electrical signal;
      transmit the processed electrical signal to a frequency counter; and
      determine, using the frequency counter based on the processed electrical signal, a frequency value.

2. The accelerometer system of claim 1, wherein the modulating device is a first modulating device, the DETF structure is a first DETF structure, the photoreceiver is a first photoreceiver, the modulated optical signal is a first modulated optical signal, the electrical signal is a first electrical signal, the processed electrical signal is a first processed electrical signal, the frequency counter is a first frequency counter, the frequency value is a first frequency value, and wherein the circuit is further configured to:
   modulate, by a second modulating device, the optical signal to produce a second modulated optical signal;
   output, to a second DETF structure, the second modulated optical signal produced by the second modulating device;
   receive, by a second photoreceiver, the second modulated optical signal;
   convert, by the second photoreceiver, the second modulated optical signal into a second electrical signal;
   process the second electrical signal to obtain a second processed electrical signal;
   transmit the second processed electrical signal to the second modulating device, wherein the second modulating device is configured to modulate the optical signal based on the second processed electrical signal;
   transmit the second processed electrical signal to a second frequency counter; and
   determine, using the second frequency counter based on the second processed electrical signal, a second frequency value.

3. The accelerometer system of claim 2,
   wherein the band-pass filter is a first band-pass filter, wherein the frequency band is a first frequency band, wherein the phase shifter is a first phase shifter, wherein the electrical amplifier is a first electrical amplifier, wherein the voltage limiter is a first voltage limiter, and wherein to process the second electrical signal, the circuit is configured to:
   filter, using a second band-pass filter, the second electrical signal to attenuate frequency components of the second electrical signal outside of a second frequency band;

shift, using a second phase shifter, a phase of the second electrical signal;

amplify, using a second electrical amplifier, an amplitude of the second electrical signal; and apply a second voltage limiter to the second electrical signal to obtain the second processed electrical signal.

4. The accelerometer system of claim 2, wherein the circuit comprises the first frequency counter, the second frequency counter, and processing circuitry, wherein the first frequency counter is configured to:

measure a first frequency profile of the first processed electrical signal, wherein the second frequency counter is configured to:

measure a second frequency profile of the second processed electrical signal, wherein the processing circuitry is configured to:

determine, based on the first frequency profile, the first frequency value corresponding to the first processed electrical signal;

determine, based on the second frequency profile, the second frequency value corresponding to the second processed electrical signal;

determine, based on the first frequency value, a first acceleration value; and determine, based on the second frequency value, a second acceleration value.

5. The accelerometer system of claim 4, wherein the processing circuitry is further configured to:

determine, based on the first acceleration value and the second acceleration value, a third acceleration value indicative of a present acceleration of the accelerometer system.

6. The accelerometer system of claim 5, wherein the third acceleration value is up to 500,000 meters per second squared (m/s$^2$).

7. The accelerometer system of claim 4, further comprising:

a proof mass;

one or more tethers;

a set of DETF structures comprising the first DETF structure and the second DETF structure; and a frame configured to suspend the proof mass using the one or more tethers and the set of DETF structures, wherein the proof mass is suspended in a first direction relative to the frame by the set of DETF structures, wherein the set of DETF structures are configured to carry the modulated optical signal, wherein the first DETF structure contacts a first side of the proof mass and the second DETF structure contacts a second side of the proof mass, the first side being opposite the second side, and wherein the proof mass is suspended in a second direction and a third direction relative to the frame by the one or more tethers.

8. The accelerometer system of claim 7, wherein the circuit is configured to:

transmit, by the first modulating device, the first modulated optical signal to the first photoreceiver via the first DETF structure; and transmit, by the second modulating device, the second modulated optical signal to the second photoreceiver via the second DETF structure.

9. The accelerometer system of claim 8, wherein the proof mass is configured to:

displace, relative to the frame, by a displacement value in the first direction, causing a length of the first DETF structure to decrease by the displacement value and causing a length of the second DETF structure to increase by the displacement value, wherein the displacement of the proof mass causes a mechanical vibration frequency of the first DETF structure to decrease from a baseline frequency value to the first frequency value, and wherein the displacement of the proof mass causes a mechanical vibration frequency of the second DETF structure to increase from the baseline frequency value to the second frequency value.

10. The accelerometer system of claim 9, wherein to determine the first acceleration value, the processing circuitry is configured to:

subtract the baseline frequency value from the first frequency value to obtain a first frequency difference value;

determine, based on the first frequency difference value, the first acceleration value, wherein to determine the second acceleration value, the processing circuitry is configured to:

subtract the baseline frequency value from the second frequency value to obtain a second frequency difference value; and determine, based on the second frequency difference value, the second acceleration value.

11. A method comprising:

emitting, by a light-emitting device, an optical signal;

modulating, by modulating device of a circuit, the optical signal to produce a modulated optical signal;

outputting, by the modulating device to a double-ended tuning fork (DETF) structure, the modulated optical signal produced by the modulating device;

receiving, by a photoreceiver of a circuit from the DETF structure, the modulated optical signal;

converting, by the photoreceiver, the modulated optical signal into an electrical signal;

processing the electrical signal to obtain a processed electrical signal, wherein processing the electrical signal comprises:

filtering, using a band-pass filter, the electrical signal to attenuate frequency components of the electrical signal outside of a frequency band;

shifting, using a phase shifter, a phase of the electrical signal;

amplifying, using an electrical amplifier, an amplitude of the electrical signal; and applying a voltage limiter to the electrical signal to obtain the processed electrical signal;

transmitting the processed electrical signal to the modulating device, wherein the modulating device is configured to modulate the optical signal based on the processed electrical signal;

transmitting the processed electrical signal to a frequency counter; and determining, using the frequency counter based on the processed electrical signal, a frequency value.

12. The method of claim 11, wherein the modulating device is a first modulating device, the DETF structure is a first DETF structure, the photoreceiver is a first photoreceiver, the modulated optical signal is a first modulated optical signal, the electrical signal is a first electrical signal, the processed electrical signal is a first processed electrical signal, the frequency counter is a first frequency counter, the frequency value is a first frequency value, and wherein the method further comprises:

modulating, by a second modulating device of the circuit, the optical signal to produce a second modulated optical signal;

outputting, to a second DETF structure, the second modulated optical signal produced by the second modulating device;

receiving, by a second photoreceiver of the circuit, the second modulated optical signal;

converting, by the second photoreceiver, the second modulated optical signal into a second electrical signal;

processing the second electrical signal to obtain a second processed electrical signal;

transmitting the second processed electrical signal to the second modulating device, wherein the second modulating device is configured to modulate the optical signal based on the second processed electrical signal; and transmitting the second processed electrical signal to a second frequency counter; and determining, using the second frequency counter based on the second processed electrical signal, a second frequency value.

13. The method of claim 12,
wherein the band-pass filter is a first band-pass filter, wherein the frequency band is a first frequency band, wherein the phase shifter is a first phase shifter, wherein the electrical amplifier is a first electrical amplifier, wherein the voltage limiter is a first voltage limiter, and wherein processing the second electrical signal comprises:
filtering, using a second band-pass filter, the second electrical signal to attenuate frequency components of the second electrical signal outside of a second frequency band;
shifting, using a second phase shifter, a phase of the second electrical signal;
amplifying, using a second electrical amplifier, an amplitude of the second electrical signal; and
applying a second voltage limiter to the second electrical signal to obtain the second processed electrical signal.

14. The method of claim 12, wherein the circuit comprises the first frequency counter, the second frequency counter, and processing circuitry, wherein the method further comprises:
measuring, using a first frequency counter, a first frequency profile of the first processed electrical signal;
measuring, using a second frequency counter, a second frequency profile of the second processed electrical signal;
determining, using the processing circuitry and based on the first frequency profile, the first frequency value corresponding to the first processed electrical signal;
determining, using the processing circuitry and based on the second frequency profile, the second frequency value corresponding to the second processed electrical signal;
determining, using the processing circuitry and based on the first frequency value, a first acceleration value; and
determining, using the processing circuitry and based on the second frequency value, a second acceleration value.

15. The method of claim 14, further comprising:
determining, based on the first acceleration value and the second acceleration value, a third acceleration value indicative of a present acceleration of the accelerometer system.

16. The method of claim 14, further comprising:
suspending, using one or more tethers and a set of DETF structures comprising the first DETF structure and the second DETF structure, the proof mass in a frame,
wherein the proof mass is suspended in a first direction relative to the frame by the set of DETF structures,
wherein the set of DETF structures are configured to carry the modulated optical signal,
wherein the first DETF structure contacts a first side of the proof mass and the second DETF structure contacts a second side of the proof mass, the first side being opposite the second side, and
wherein the proof mass is suspended in a second direction and a third direction relative to the frame by the one or more tethers.

17. The method of claim 16, further comprising:
transmitting, by the first modulating device, the first modulated optical signal to the first photoreceiver via the first DETF structure; and
transmitting, by the second modulating device, the second modulated optical signal to the second photoreceiver via the second DETF structure.

18. The method of claim 17, further comprising:
displacing the proof mass relative to the frame by a displacement value in the first direction, causing a length of the first DETF structure to decrease by the displacement value and causing a length of the second DETF structure to increase by the displacement value,
wherein displacing the proof mass causes a mechanical vibration frequency of the first DETF structure to decrease from a baseline frequency value to the first frequency value, and
wherein displacing the proof mass causes a mechanical vibration frequency of the second DETF structure to increase from the baseline frequency value to the second frequency value.

19. The method of claim 18, wherein to determining the first acceleration value comprises:
subtracting the baseline frequency value from the first frequency value to obtain a first frequency difference value; and
determining, based on the first frequency difference value, the first acceleration value, wherein determining the second acceleration value comprises:
subtracting the baseline frequency value from the second frequency value to obtain a second frequency difference value; and
determining, based on the second frequency difference value, the second acceleration value.

20. A circuit configured to:
receive, by a modulating device, an optical signal from a light-emitting device;
modulate, by the modulating device, the optical signal to produce a modulated optical signal;
output, by the modulating device to a double-ended tuning fork (DETF) structure, the modulated optical signal produced by the modulating device;
receive, by a photoreceiver from the DETF structure, the modulated optical signal;
convert, by the photoreceiver, the modulated optical signal into an electrical signal;
process the electrical signal to obtain a processed electrical signal, wherein to process the electrical signal, the circuit is configured to:
filter, using a band-pass filter, the electrical signal to attenuate frequency components of the electrical signal outside of a frequency band;

shift, using a phase shifter, a phase of the electrical signal;
amplify, using an electrical amplifier, an amplitude of the electrical signal; and
apply a voltage limiter to the electrical signal to obtain the processed electrical signal;

transmit the processed electrical signal to the modulating device, wherein the modulating device is configured to modulate the optical signal based on the processed electrical signal;

transmit the processed electrical signal to a frequency counter; and determine, using the frequency counter based on the processed electrical signal, a frequency value.

* * * * *